(12) United States Patent
Nakano et al.

(10) Patent No.: US 7,333,165 B2
(45) Date of Patent: Feb. 19, 2008

(54) LIQUID-CRYSTAL DISPLAY APPARATUS AND ELECTRONIC DEVICE

(75) Inventors: Minoru Nakano, Kanagawa (JP); Kunihito Saiki, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/429,171

(22) Filed: May 5, 2006

(65) Prior Publication Data
US 2006/0256257 A1    Nov. 16, 2006

(30) Foreign Application Priority Data
May 11, 2005    (JP)    ............... 2005-138663
Feb. 21, 2006   (JP)    ............... 2006-044304

(51) Int. Cl.
  G02F 1/1335    (2006.01)
  G09F 3/36      (2006.01)
  G09G 5/00      (2006.01)
(52) U.S. Cl. ................ 349/68; 349/61; 345/102; 345/207; 362/612; 362/613
(58) Field of Classification Search .......... 349/68
See application file for complete search history.

(56) References Cited

U.S. PATENT DOCUMENTS

| 5,475,512 A | * | 12/1995 | Nakazawa et al. ......... 359/13 |
| 6,447,132 B1 | * | 9/2002 | Harter, Jr. ............. 362/29 |
| 2001/0052955 A1 | | 12/2001 | Nagatani |
| 2005/0200295 A1 | * | 9/2005 | Lim et al. ............. 315/150 |

FOREIGN PATENT DOCUMENTS

| JP | 3000560 B2 | 11/1999 |
| JP | 2002-149135 | 5/2002 |
| JP | 2005-100837 A | 4/2005 |

OTHER PUBLICATIONS

Extended European Search Report, EP 06 25 2479, Dated Jul. 27, 2006.

* cited by examiner

*Primary Examiner*—Michael H. Caley
(74) *Attorney, Agent, or Firm*—Lerner, David, Littenberg, Krumholz & Mentlik, LLP

(57) ABSTRACT

A liquid-crystal display apparatus includes a liquid-crystal panel (25) having a color filter (26), a W light-emitting diode (22w) for irradiating white light to the liquid-crystal panel (25), RGB light-emitting diodes (22r, 22g, 22b) for irradiating lights of more than two colors containing white to the liquid-crystal panel (25), a luminance sensor (44) for detecting ambient illuminance of the liquid-crystal panel (25) to output a detected signal and a control unit (41) for switching the W light-emitting diode (22w) and the RGB light-emitting diodes (22r, 22g, 22b) based on the detected signal from the luminance sensor (44). In a related-art liquid-crystal display apparatus, since lights of red (R), green (G) and blue (B) are emitted with a time lag and superimposed upon each other so that a clear color may not be obtained in each pixel, thus resulting in insufficient color reproducing capability. According to the present invention, these defects encountered with the related art can be obviated.

4 Claims, 22 Drawing Sheets

$\gamma = 2.2$
Luminance $= 150 cd/m^2$

γ = 1.0 to 1.5/2.2 Switch
Luminance = 300/150cd/m² Switch

LIQUID-CRYSTAL DISPLAY APPARATUS AND ELECTRONIC DEVICE

CROSS-REFERENCE TO RELATED APPLICATIONS

The present application claims priority from Japanese Patent Application Nos. JP 2005-138663 filed on May 11, 2005 and JP 2006-044304 filed on Feb. 21, 2006 the disclosures of which are hereby incorporated by reference herein.

BACKGROUND OF THE INVENTION

The present invention relates to a liquid-crystal display apparatus including a liquid-crystal panel having a color filter and its light source and an electronic device, and particularly to a liquid-crystal display apparatus including a first light source for emitting light of white color (first white light) as a backlight and a second light source for emitting light of white color different from the first white color (second white light) such that the first and second light sources can be switched in response to ambient illuminance and an electronic device including the liquid-crystal display apparatus.

The Cited Patent Reference 1, for example, has so far described this kind of liquid-crystal display apparatus. That is, the Cited Patent Reference 1 has described a field sequential color liquid-crystal display apparatus suitable for displaying real pictures, such as a monitor receiver and a large-sized television receiver. The liquid-crystal display apparatus described in the Cited Patent Reference 1 includes a liquid-crystal panel, a light source for irradiating light to the liquid-crystal panel and a drive means for switching the color of the light source in a time-sequential fashion and which controls the state in which light is passed through or reflected on the liquid-crystal panel in synchronism therewith. This liquid-crystal display apparatus is characterized by a plurality of driving means composed of a driving means for carrying out color display by additive mixture of color stimuli from a time standpoint and a driving means for carrying out monochromatic color display by a single color based on gradation display.

According to the liquid-crystal display apparatus having the above-mentioned arrangement described in the Cited Patent Reference 1, since this liquid-crystal display apparatus has the arrangement in which the field sequential color system driving to carry out ordinary color display and the monochromatic color display driving without color cracking and of which power consumption is small are switched, there can be obtained the liquid-crystal display apparatus of which power consumption can be decreased on the whole and which is able to display real moving pictures with high definition.

The Cited Patent Reference 2 has described other example of a liquid-crystal display apparatus according to the related art. That is, the Cited Patent Reference 2 has described the liquid-crystal display apparatus using a liquid crystal as a display medium. The liquid-crystal display apparatus described in the Cited Patent Reference 2 includes a first transparent insulating substrate with a plurality of transparent pixel electrodes disposed thereon, a second transparent insulating substrate having transparent electrodes opposing to the above transparent pixel electrodes, a liquid crystal disposed between the above first and second transparent insulating substrates, a color display backlight light source disposed in an opposing fashion to the above second transparent insulating substrate to sequentially emit lights of colors of three primary colors and a control circuit for controlling the liquid crystal so as to properly orient molecules.

According to the liquid-crystal display apparatus having the above arrangement described in the Cited Patent Reference 2, since this liquid-crystal display apparatus has the arrangement in which lights of three primary colors of the color display backlight light source which emit lights of three primary colors are sequentially emitted and in which transmittance of one pixel is changed in response to each color, many colors can be expressed by one pixel and color display dot can be displayed by one pixel. Hence, resolution can be increased, a quantity of light can be prevented from being lost by the color filter, a quantity of light of the backlight light source can be used effectively and luminance of display can be increased.

[Cited Patent Reference 1]: Japanese Published Patent Application No. 2003-248463

[Cited Patent Reference 2]: Japanese Published Patent Application No. 6-110033

FIG. 1 of the accompanying drawings is a schematics diagram showing an example of a liquid-crystal display apparatus according to the related art. This liquid-crystal display apparatus according to the related art uses a light emitting diode for emitting light of white (W) as a light source of a backlight. A liquid-crystal display apparatus, generally depicted by reference numeral 1 in FIG. 1, is composed of a backlight 2, a first sheet polarizer 3, a first substrate 4, a liquid-crystal 5, a color filter 6, a second substrate 7 and a second sheet polarizer 8. The backlight 2 is composed of a plurality of white light-emitting diodes and these white light-emitting diodes are arrayed on the same straight line or on the same plane.

The first sheet polarizer 3 is bonded to one surface of the first substrate 4 and the backlight 2 is located behind the first sheet polarizer 3 with a proper gap in an opposing fashion. The liquid-crystal 5 is bonded to the other surface of the first substrate 4 and the color filter 6 is bonded to the other surface of the liquid-crystal 5. The color filter 6 has red (R), green (G) and B (blue) filter regions 6r, 6g and 6b repeatedly located thereon with the same gap in the upper and lower direction and in the right and left direction. Then, the second sheet polarizer 8 is bonded to the other surface of the second substrate 7.

Thus, when the backlight 2 is energized, emitted light of white color is irradiated from the first sheet polarizer 3 through the first substrate 4 to the liquid-crystal 5, and light that was passed through the liquid-crystal 5 is radiated to the outside from the second sheet polarizer 8 through the color filter 6 and the second substrate 7. In that case, light is passed through the filter regions 6r, 6g and 6b of the color filter 6, whereby lights of red (R), green (G) and blue (B) corresponding to the colors of the respective filter regions 6r, 6g and 6b are radiated to form a color image.

FIG. 2 is a schematic diagram showing another example of a liquid-crystal display apparatus according to the related art. This liquid-crystal display apparatus according to the related art uses more than three RGB light-emitting diodes to emit light of three colors of RGB of red, green and blue as a backlight light source thereof. A liquid-crystal display apparatus, generally depicted by reference numeral 10 in FIG. 2, has the arrangement identical to that of the liquid-crystal display apparatus 1 except a backlight 9. As shown in FIG. 2, the backlight 9 is composed of a combination of a red light-emitting diode to emit red, (R) light, a green light-emitting diode to emit green (G) light and a blue light-emitting diode to emit blue (B) light, and these three-color light-emitting diodes are repeatedly arrayed on the same plane at the same order.

Thus, when the backlight 9 is energized, emitted lights of three colors of red, green and blue colors are superimposed upon each other to generate light of white, and white light is irradiated from the first sheet polarizer 3 through the first substrate 4 to the liquid-crystal 5. Light that was passed through this liquid-crystal 5 is radiated to the outside from the second sheet polarizer 8 through the second substrate 7. In that case, light is passed through the filter regions 6r, 6g and 6b of the color filter 6, whereby lights of red, green and blue corresponding to the colors of the respective filter regions 6r, 6g and 6b are radiated to the outside to form a color image.

FIGS. 3A, 3B and 3C are respectively graphs graphing spectral characteristics of the aforementioned liquid-crystal display apparatus 1. Specifically, FIG. 3A is a graph showing spectral characteristics of the color filter 6, FIG. 3B is a graph showing spectral characteristics of the white light-emitting diode, and FIG. 3C is a graph showing spectral characteristics of the whole of the liquid-crystal display apparatus 1, respectively. As shown in FIG. 3A, in the spectral characteristics of the color filter 6, peaks of the spectral characteristics are generated at three portions. That is, the first peak corresponds to the blue filter region 6b and it has a peak value at a wavelength of approximately 470 nm as shown by a dot-and-dash line B. The second peak corresponds to the green filter region 6g and it has a peak value at a wavelength of approximately 520 nm as shown by a solid line G. Also, the third peak corresponds to the red filter region 6r and it has a peak value at a wavelength of approximately 620 nm as shown by a broken line R.

Further, as shown in FIG. 3B, in the white light-emitting diode, peaks of the spectral characteristics are generated at two portions. Specifically, the first peak lies at a wavelength of approximately 440 nm and the second peak lies in a wide range of wavelengths ranging of from approximately 530 nm to approximately 630 nm. The second peak is generated when three colors of red (R), green (G) and blue (B) are mixed. As a result, as shown in FIG. 3C, in the whole of the liquid-crystal display apparatus 1, peaks of the spectral characteristics are generated at three portions and large troughs are generated at two portions among the above-mentioned three peaks. The first trough is generated at a wavelength of approximately 480 nm and the second trough is generated at a wavelength of approximately 570 nm. These two troughs are generated when the three colors of R, G, B (red, greens, blue) are mixed.

FIGS. 4A, 4B and 4C are graphs graphing spectral characteristics of the aforementioned liquid-crystal display apparatus 10. More specifically, FIG. 4A is a graph showing spectral characteristics of the same color filter 6, FIG. 4B is a graph showing spectral characteristics of the RGB light emitting diodes, and FIG. 4C is a graph showing spectral characteristics of the whole of the liquid-crystal display apparatus 10, respectively.

As shown in FIG. 4A, in the RGB light-emitting diodes, peaks of the spectral characteristics are generated at three portions. Specifically, the first peak lies at wavelength of approximately 470 nm, the second peak lies at a wavelength of approximately 530 nm, and the third peak lies at a wavelength of approximately 630 nm. As shown in FIG. 4B, two troughs are generated among these three peaks. The first trough is generated at a wavelength of approximately 500 nm and the second trough is generated at a wavelength of approximately 580 nm. These two troughs are generated when the three colors of R, G, B (red, green, blue) are separated from each other.

Consequently, as shown in FIG. 4C, in the whole of the liquid-crystal display apparatus 10, peaks of the spectral characteristics are generated at three portions and large troughs are generated at the two portions among these three peaks. The first trough is generated at a wavelength of approximately 480 nm and the second trough is generated at a wavelength of 570 nm. These three peaks and two troughs correspond to the spectral characteristics of the RGB light-emitting diodes and they are generated when the three colors of R, G, B (red, green, blue) are separated from each other.

FIG. 5 is a graph showing color reproducing ranges of the liquid-crystal display apparatus 1 having the spectral characteristics shown in FIGS. 3A, 3B and 3C and the liquid-crystal display apparatus 10 having the spectral characteristics shown in FIGS. 4A, 4B and 4C. More specifically, a triangle 11, shown by a two-dot-and dash line in FIG. 5, shows a color reproducing range of the white light-emitting diode, and a triangle 12, shown by a solid line, shows a color reproducing range of the RGB three color light-emitting diodes. A study of the graph of FIG. 25 may reveal the fact that, when the RGB three light-emitting diodes are used as the backlight light source, the color reproducing ranges can be expanded in all regions of the red, green and blue regions as compared with the case in which the white light-emitting diode is used as the backlight light source.

In the above-mentioned liquid-crystal display apparatus, in recent years, various kinds of new technologies have been developed and adopted as methods for expanding the color reproducing range. For example, development or new pigments for use with color filters, improvements of LEDs of three colors and developments of new cold cathode-ray tubes are various kinds of new technologies.

In this case, most of electronic devices including a liquid-crystal display apparatus having a relatively large picture screen larger than a 10-inch-size picture screen, such as a large-sized liquid-crystal display panel type television receiver and a notebook size personal computer, use a cold cathode-ray tube (that is, cold CRT). However, since a high voltage is required to drive the cold cathode-ray tube, in the actual situations, the cold cathode-ray tube is hardly used in portable electronic devices because portable electronic devices tend to regard small power consumption as being important. Also, most of portable electronic devices such as a mobile phone with a small-size screen, a digital still camera, a built-in camera type image pickup apparatus and a PDA (personal digital assistant) uses a white LED (light-emitting diode), which can be driven by a low voltage, from various standpoints such as the size of electronic device products and power consumption.

However, while the liquid-crystal display apparatus described in the above-mentioned Cited Patent Reference 1 uses a black-and-white liquid-crystal display panel in which each pixel of the liquid-crystal panel is not provided with a color filter so that such liquid-crystal display apparatus is excellent in responsiveness of liquid-crystal, high-speed responsiveness being made possible, it is necessary to constantly switch the circuits by a switching unit in order to emit lights of red (R), green (G) and blue (B), and hence the related-art liquid-crystal display apparatus is not able to emit lights of red (R), green (G) and blue (B) at the same time. Therefore, because light-emissions of red (R), green (G) and blue (B) should be superimposed upon each other with a time lag, it is not possible to obtain a clear color of each pixel and hence a color reproducing capability of such related-art liquid-crystal display apparatus is not sufficient.

Also, in the liquid-crystal display apparatus described in the above-mentioned Cited Patent Reference 2, since three colors of the backlight light source which emits lights of three primary colors should be emitted sequentially, many colors are expressed at one pixel by changing transmittance of each color in one pixel in response to a pixel signal and one dot of color display is displayed by one pixel a clear color may not be obtained at each pixel and a color reproducing capability is not sufficient similarly as described above.

The problems that the present invention intends to solve are such ones in which the related-art liquid-crystal display apparatus should superimpose the light-emissions of red (R), green (G) and blue (B) upon each other with a time lag so that each pixel may not produce a clear color and that a color reproducing capability is not sufficient.

SUMMARY OF THE INVENTION

In view of the aforesaid aspects, the present invention intends to provide a liquid-crystal display apparatus in which clear and beautiful colors cat be visually confirmed by expanding color producing ranges.

Further, the present invention intends to provide a liquid-crystal display apparatus in which electric power can be consumed more efficiently so that a time period in which the liquid-crystal display apparatus is driven can be extended.

Further, the present invention intends to provide a liquid-crystal display apparatus in which color display can be made clear, if necessary, so that viewers are able to watch a beautiful picture.

Furthermore, the present invention intends to provide an electronic device including the above-mentioned liquid-crystal display apparatus.

According to an aspect of the present invention, there is provided a liquid-crystal display apparatus which is comprised of a liquid-crystal panel having a color filter, a first light source for irradiating first white light to the liquid-crystal panel, a second light source for irradiating second white light different from the first white light to the liquid-crystal panel, an illuminance detecting means for detecting ambient illuminance of the liquid-crystal panel to output a detected signal and a light source control means for switching the first and second light sources based on the detected signal from the illuminance detecting means.

In the liquid-crystal display apparatus according to the present invention, the second light source is composed of a combination of more than two light-emitting bodies which emit lights of different colors, the combination being capable of generating white light by combining lights radiated from all light-emitting bodies.

Further, in the liquid-crystal display apparatus according to the present invention, the light source control means compares the illuminance detected value detected based on the detected signal from the illuminance detecting means with a predetermined illuminance reference value, the light source control means energizes the first light source if it is determined based on the compared result that the illuminance detected value is larger than the illuminance reference value and the light source control means energizes the second light source if it is determined based on the compared result that the illuminance detected value is smaller than the illuminance reference value.

Furthermore, in the liquid-crystal display apparatus according to the present invention, the illuminance detecting means includes at least one of a luminance sensor and a white balance sensor.

In accordance with another aspect of the present invention, there is provided an electronic device including a liquid-crystal display device comprising a liquid-crystal panel having a color filter, a first light source for irradiating first white light to the liquid-crystal panel and a second light source for irradiating second white light different from the first white light to the liquid-crystal panel and a control apparatus for displaying color image by controlling the state in which light is passed through the liquid-crystal panel or light is reflected on the liquid-crystal panel, the liquid-crystal display apparatus comprising an illuminance detecting means for detecting ambient illuminance of the liquid-crystal panel to output a detected signal and a light source control means for switching the first and second light sources bashed on the detected signal from the illuminance detecting means.

According to the liquid-crystal display apparatus and the electronic device of the present invention, the illuminance detecting means compares the ambient illuminance of the liquid-crystal panel with the reference illuminance, and the light source control means switches the first and second light sources in response to the compared result of the illuminance, whereby the first light source for emitting white light is driven to decrease power consumption when a viewer watches the liquid-crystal panel in the outdoor with large illuminance or when a viewer watches the liquid-crystal panel over a long period of time. Whereas, when a user watches the liquid-crystal panel in the indoor with small illuminance, the second light source for emitting more than two lights containing white light is driven to widen a color reproducing range. As a result, the viewer is able to visually confirm clear and beautiful colors.

According to the present invention, it is possible to realize the liquid-crystal display apparatus and the electronic device in which the light source is switched in response to the ambient illuminance of the liquid-crystal panel and the two light sources are selectively used in response to a use so that electric power consumption can be consumed more efficiently, a time in which the liquid-crystal display apparatus and the electronic device are driven in use can be extended, color image can be made clear if necessary, thus to make it possible for viewers to visually confirm beautiful pictures.

BRIEF DESCRIPTION OF THE DRAWINGS

FIGS. 3A, 3B and 3C are graphs showing spectral characteristics of a first light source, wherein FIG. 3A shows spectral characteristics or a color filter; FIG. 3B shows spectral characteristics of a white light-emitting diode; and FIG. 3C shows spectral characteristics of lights that passed through a liquid-crystal panel, respectively;

FIGS. 4A, 4B and 4C are graphs showing spectral characteristics of a first light source, wherein FIG. 4A shows spectral characteristics of a color filter; FIG. 4B shows spectral characteristics of red, green and blue light-emitting diodes; and FIG. 4C shows spectral characteristics of lights that passed through a liquid-crystal panel, respectively;

FIGS. 10A, 10B, 10C and 10D are explanatory diagrams showing examples of combinations of four color light-emitting diodes as a first embodiment of a backlight according to a liquid-crystal display, apparatus of, the present invention, respectively, wherein FIG. 10A shows a combination of one package of a white light-emitting diode and one package of red, green and blue light-emitting diodes; FIG. 10B shows a combination of packages of white, red, green and blue light-emitting diodes; FIG. 10C shows a combination of one package of a white light-emitting diode and packages of any two of red, green and blue light-emitting diodes; and FIG. 10D shows a combination of one package of a white light-emitting diode and packages of any two colors of combined red, green and blue light-emitting diodes;

FIGS. 11A, 11B and 11C are explanatory diagrams showing examples of arrangements of light-emitting diodes and packages as a first embodiment of a backlight according to a liquid-crystal display apparatus according to the present invention, respectively, wherein FIG. 11A shows an example in which one package of a white light-emitting diode and one package of red, green and blue light-emitting diode are located alternately; FIG. 11B shows an example in which two of one package of red, green and blue light-emitting diodes are alternately located relative to one package of a white light-emitting diode; and FIG. 11C shows an example in which three of one package of red, green and blue light-emitting diodes are alternately located relative to one package of a white light-emitting diode;

FIGS. 12A, 12B and 12C are explanatory diagrams showing examples in which the light-emitting diodes and the packages, shown in FIG. 11B, of the liquid-crystal display apparatus according to the present invention are energized, respectively, wherein FIG. 12A shows the state in which all of the white, red, green and blue light-emitting diodes are energized; FIG. 12B shows the state in which the red, green and blue light-emitting diodes other than the white light-emitting diode are energized; and FIG. 12C shows the state in which only the white light-emitting diode is energized, the red, green and blue light-emitting diode being de-energized;

FIGS. 18A and 18B show embodiments of white light-emitting bodies of the liquid-crystal display apparatus according to the present invention, wherein FIG. 18A is a cross-sectional view of a first white light-emitting body; and FIG. 18B is a cross-sectional view of a second white light-emitting body;

FIGS. 19A, 19B and 19C show examples of arrangements of the first white light-emitting body and the second white light-emitting body as the second embodiment of the backlight of the liquid-crystal display apparatus according to the present invention, respectively, wherein FIG. 19A is an explanatory diagram showing an example of the arrangement in which the first and second white bodies are arrayed alternately; FIG. 19B is an explanatory diagram showing an example of the arrangement in which two second white light-emitting bodies are arrayed relative to one first light-emitting body; and FIG. 19C is an explanatory diagram showing an example of the arrangement in which three second white light-emitting bodies are arrayed relative to one first light-emitting body;

FIGS. 20A, 20B and 20C show examples in which the first and second white light-emitting bodies, shown in FIG. 19A, of the liquid-crystal display apparatus according to the present invention are energized, respectively, wherein FIG. 19A is an explanatory diagram showing the state in which all of the first and second white light-emitting bodies are energized; FIG. 19B is an explanatory diagram showing the state in which the first white light-emitting body is de-energized and only the second white light-emitting bodies are energized; and FIG. 19C is an explanatory diagram showing the state in which the second white light-emitting bodies are de-energized and only the first white light-emitting body is energized;

DETAILED DESCRIPTION

Embodiments of the present invention will be described below with reference to the attached drawings.

Figure 6:
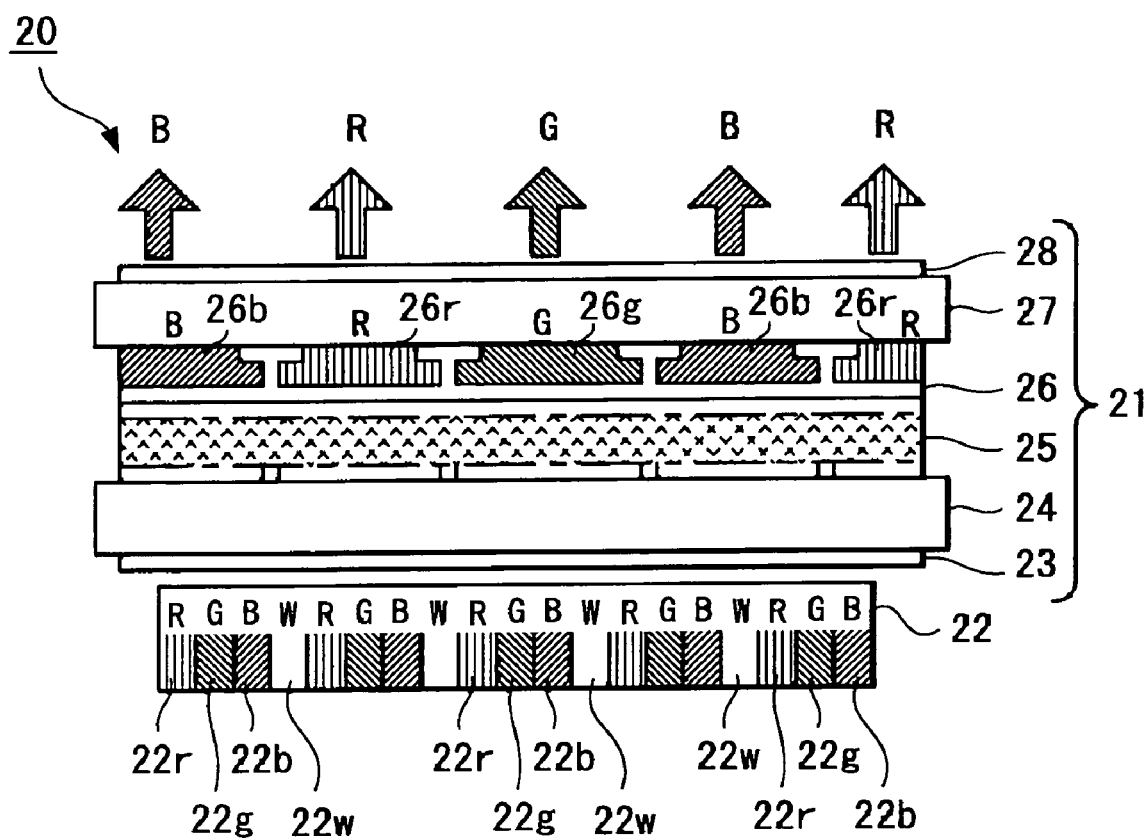
FIG. 6 is an explanatory diagram showing a schematic arrangement of a first embodiment of a liquid-crystal display apparatus according to the present invention.
Figure 7:
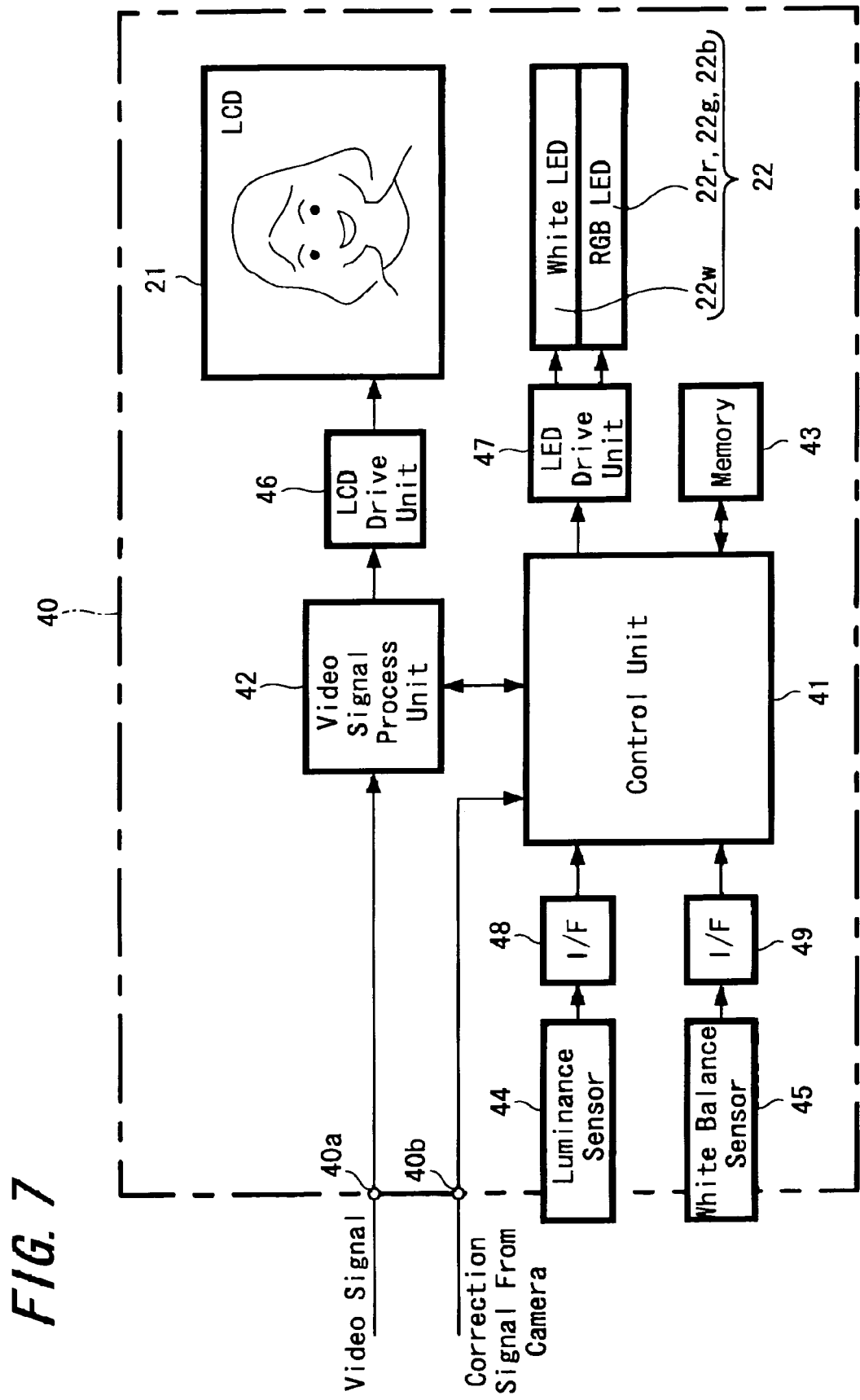
FIG. 7 is a block diagram showing a first embodiment of an electronic device that uses a liquid-crystal display apparatus according to the present invention.
Figure 8:
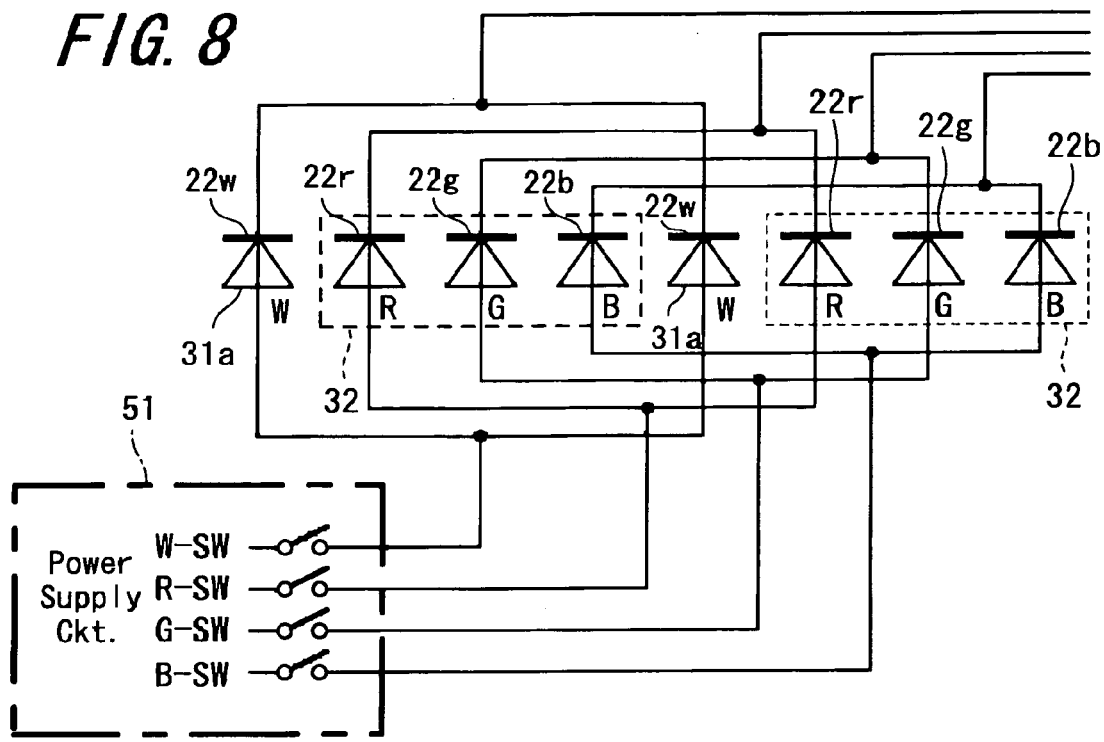
FIG. 8 is a block diagram showing a first embodiment of a power supply circuit that uses a liquid-crystal display apparatus according to the present invention.
Figure 9:
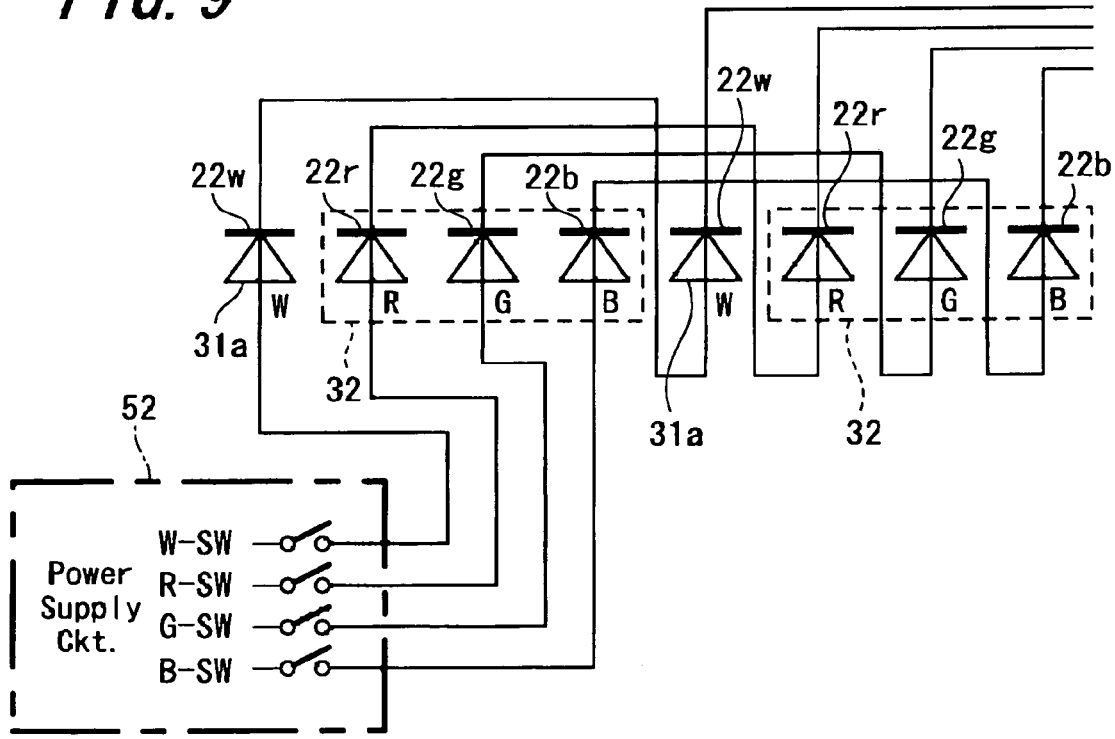
FIG. 9 is a block diagram showing a second embodiment of a power supply circuit that uses a liquid-crystal display apparatus according to the present invention.
Figure 11A:
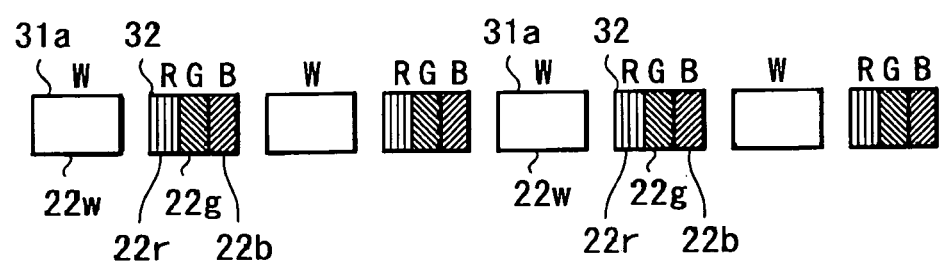
Figure 11B:
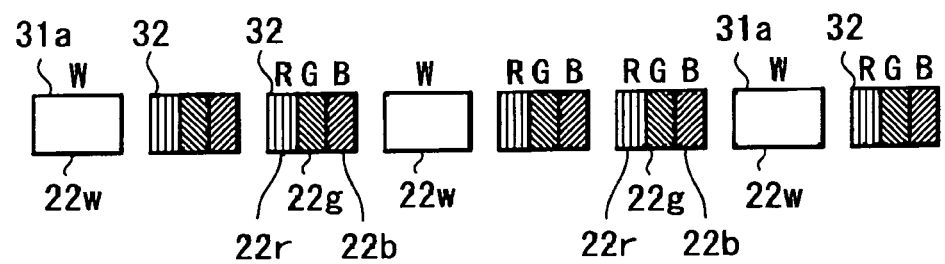
Figure 11C:
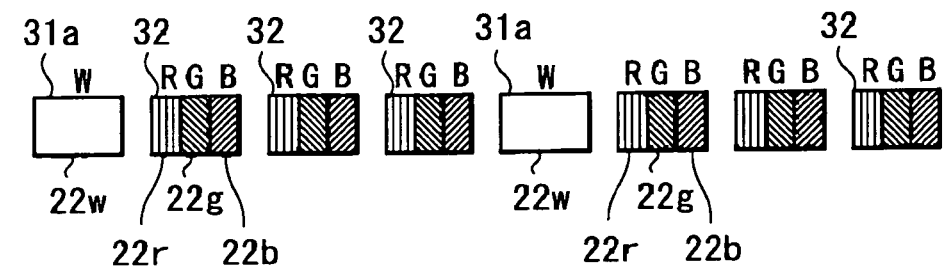
Figure 12A:
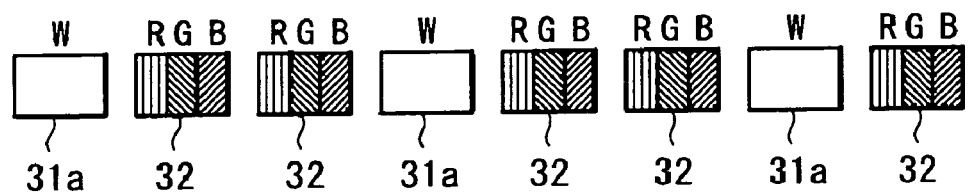
Figure 12B:
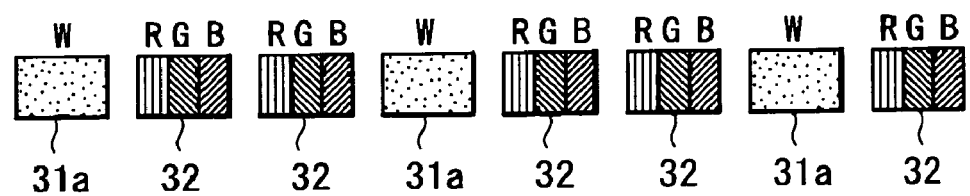
Figure 12C:
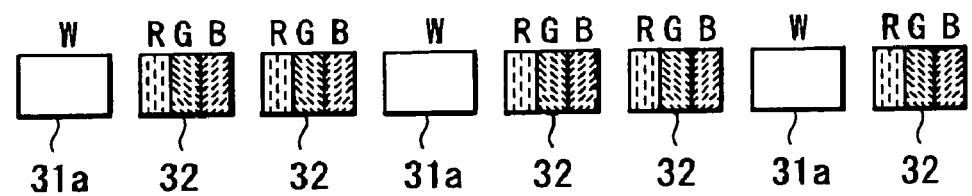
Figure 13:
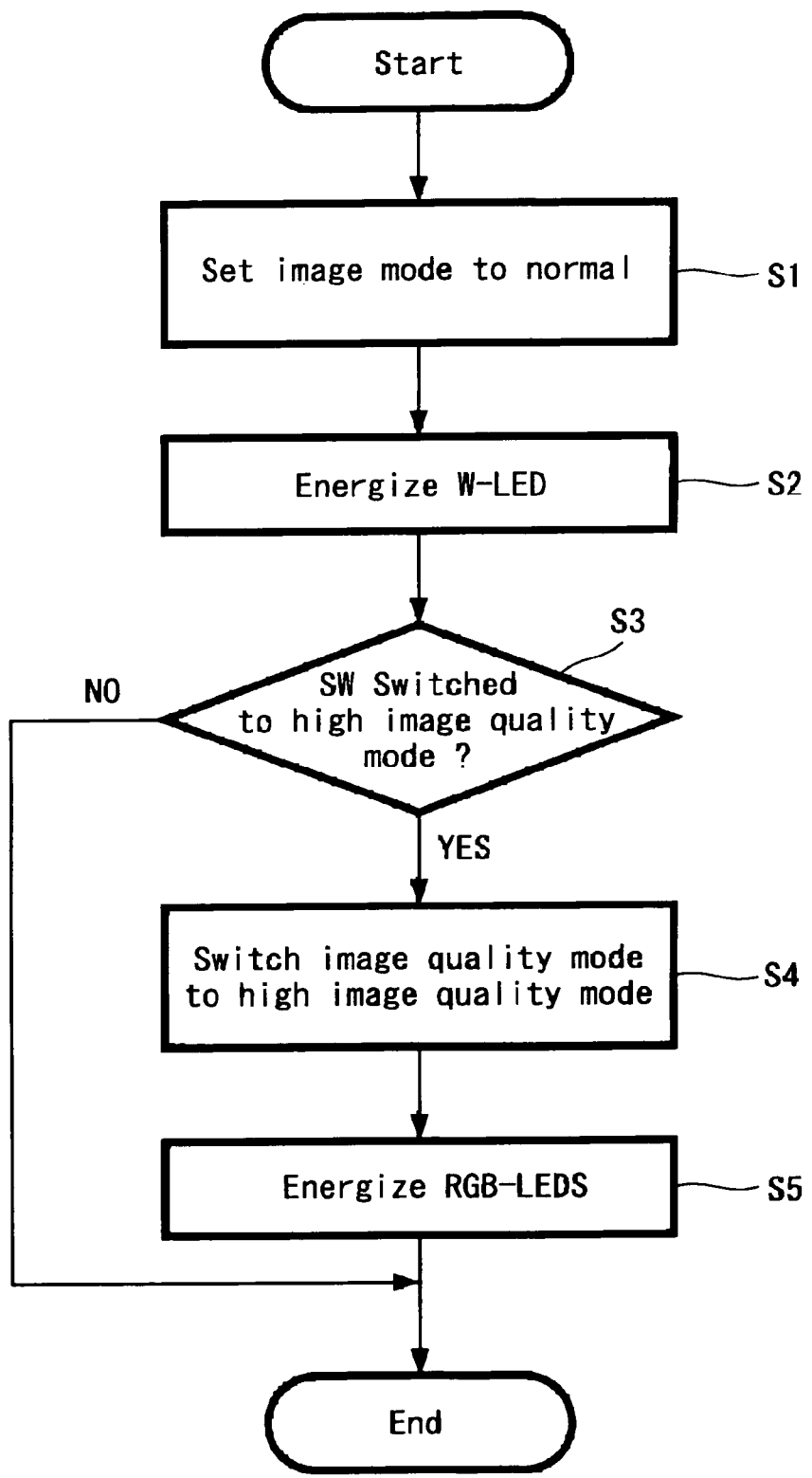
FIG. 13 is a flowchart to which reference will be made in explaining the first embodiment of control operations done by a control apparatus of the liquid-crystal display apparatus according to the present invention.
Figure 14:
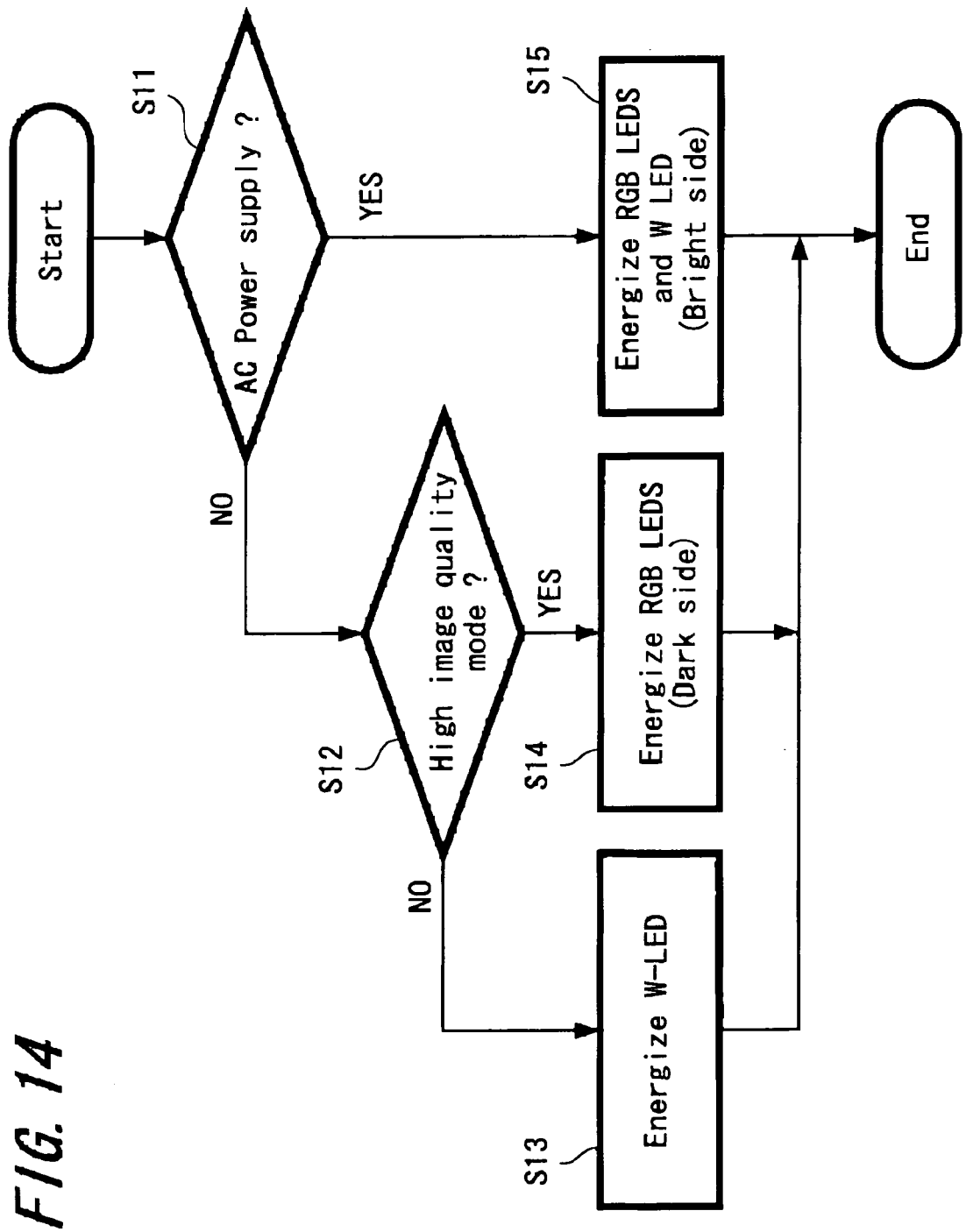
FIG. 14 is a flowchart to which reference will be made in explaining the second embodiment of control operations done by a control apparatus of the liquid-crystal display apparatus according to the present invention.
Figure 15:
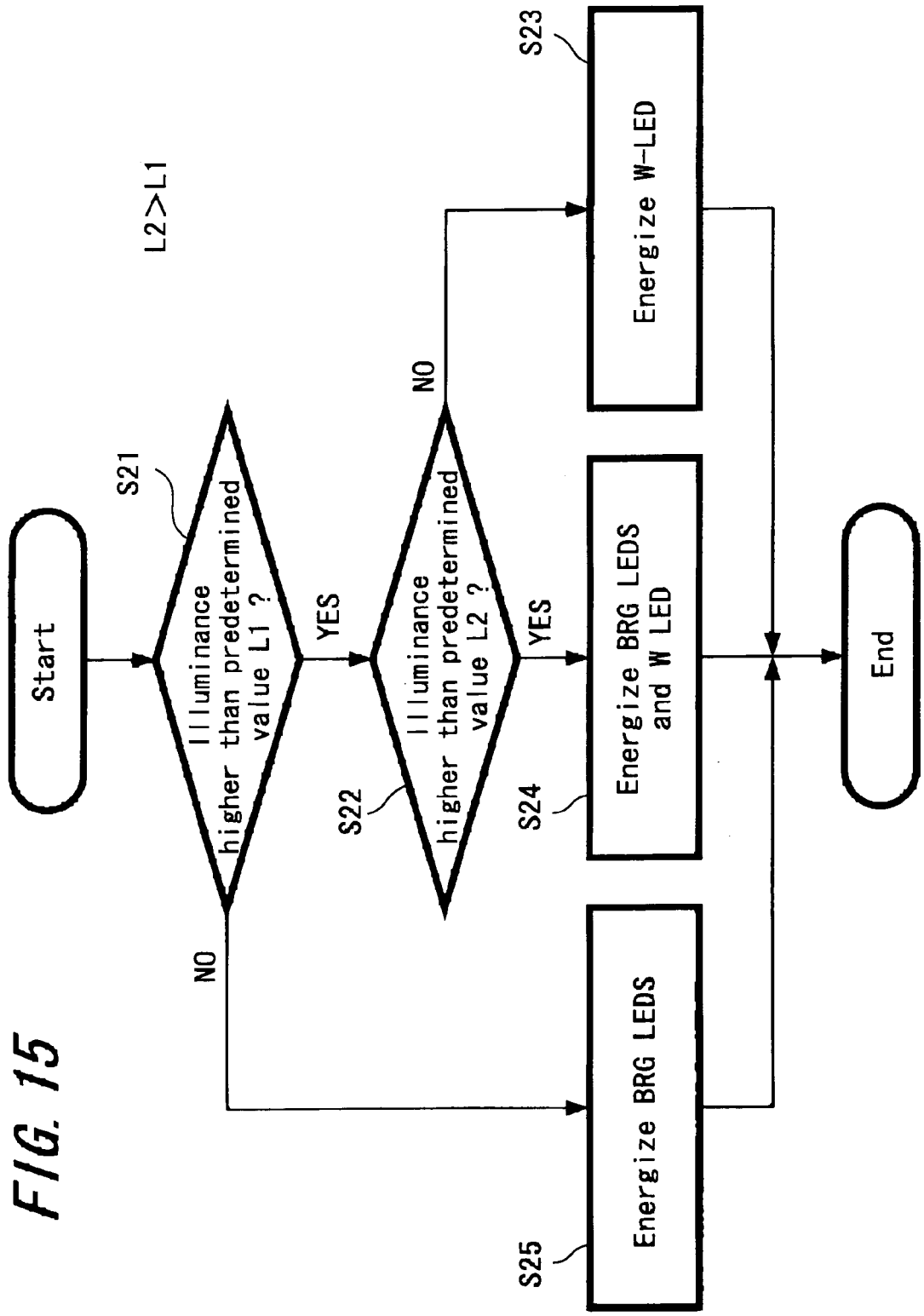
FIG. 15 is a flowchart to which reference will be made in explaining the third embodiment of control operations done by a control apparatus of the liquid-crystal display apparatus according to the present invention.

FIGS. 6 to 25 are diagrams to which reference will be made in explaining the embodiments of the present invention. More specifically, FIG. 6 is an explanatory diagram showing a schematic arrangement of the first embodiment of the liquid-crystal display apparatus according to the present invention. FIG. 7 is a block diagram showing a schematic arrangement of an electronic device that uses the liquid-crystal display apparatus shown in FIG. 6. FIGS. 8 and 9 are block diagrams showing the embodiments of power supply circuits for use with the liquid-crystal display apparatus shown in FIG. 6. FIGS. 10A, 10B, 10C and 10D are explanatory diagrams showing examples of combinations of respective color light-emitting diodes constructing the backlight of the liquid-crystal display apparatus shown in FIG. 6, respectively. FIGS. 11A, 11B and 11C are explanatory diagrams showing examples of arrangements of the light-emitting diodes and the packages constructing the backlight of the liquid-crystal display apparatus shown in FIG. 6, respectively. FIGS. 12A, 12B and 12C are explanatory diagrams showing examples in which the light-emitting diodes and the packages constructing the backlight of the liquid-crystal display apparatus shown in FIG. 6 are energized, respectively. FIGS. 13, 14 and 15 are flowcharts showing examples of control operations done by the control apparatus of the liquid-crystal display apparatus shown in FIG. 6, respectively.

Figure 16:
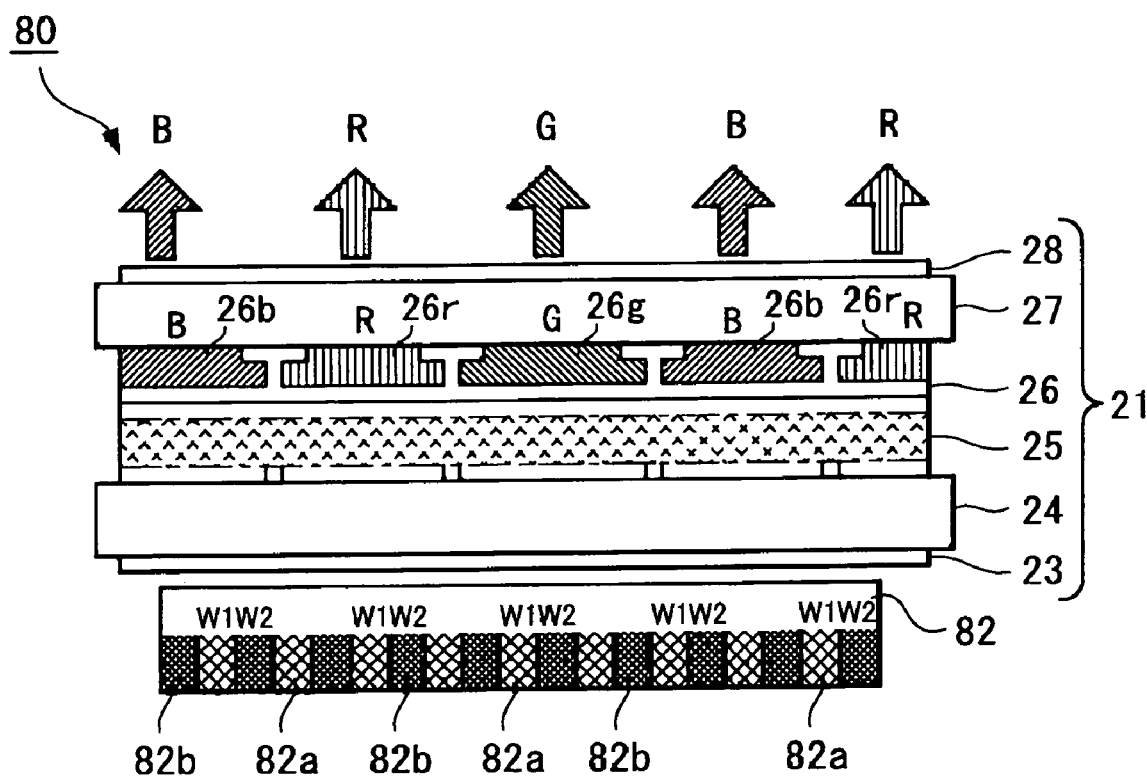
FIG. 16 is an explanatory diagram showing a schematic arrangement of the second embodiment of the liquid-crystal display apparatus according to the present invention.
Figure 17:
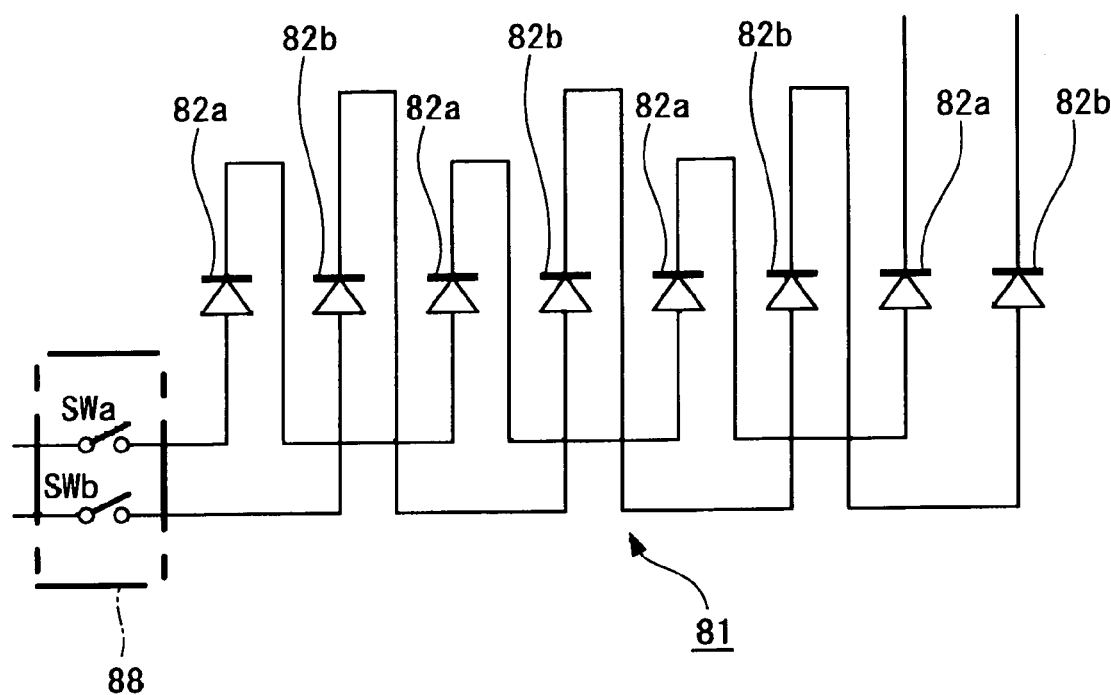
FIG. 17 is a block diagram showing the third embodiment of the power supply circuit that uses the liquid-crystal display apparatus according to the present invention.
Figure 18A:
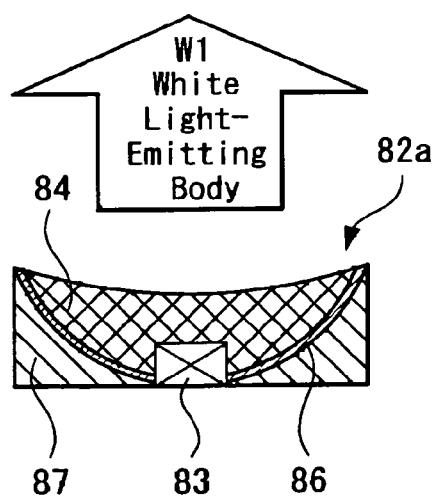
Figure 18B:
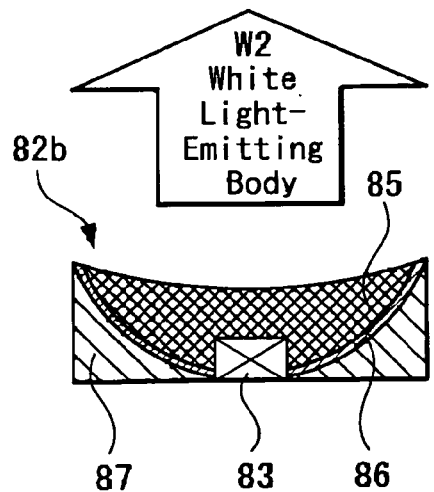
Figure 19A:
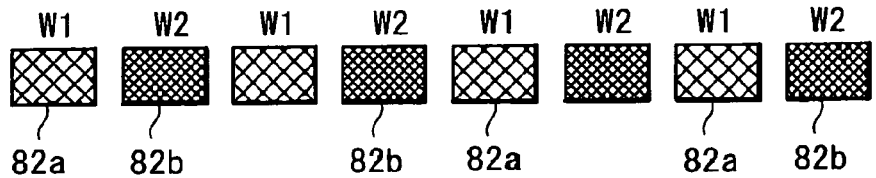
Figure 19B:
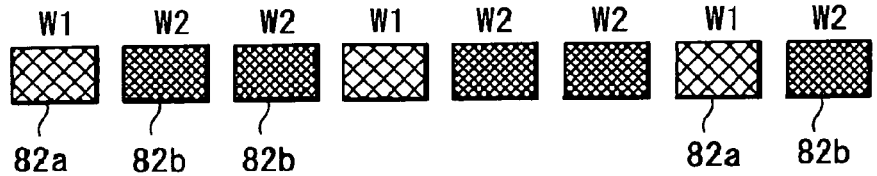
Figure 19C:
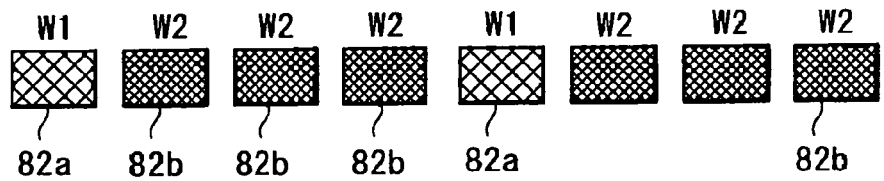
Figure 20A:
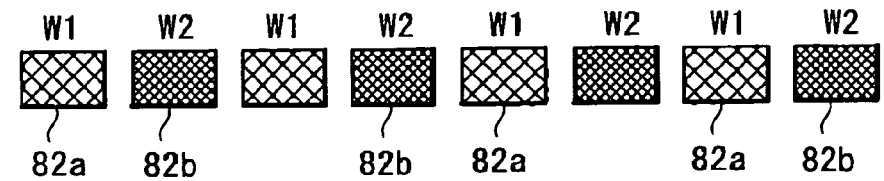
Figure 20B:
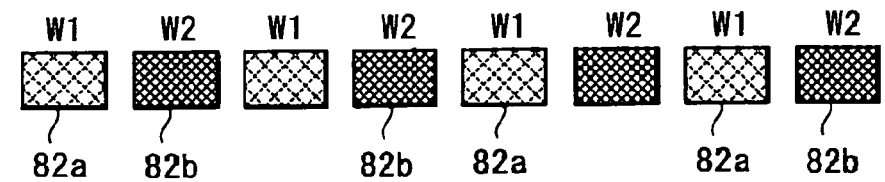
Figure 20C:
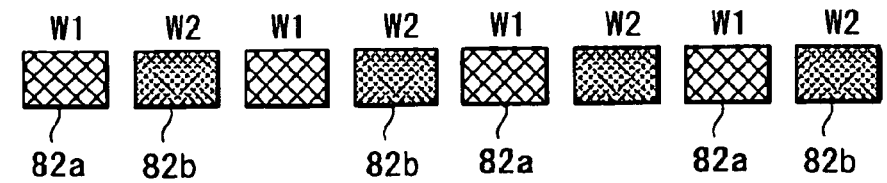
Figure 21:
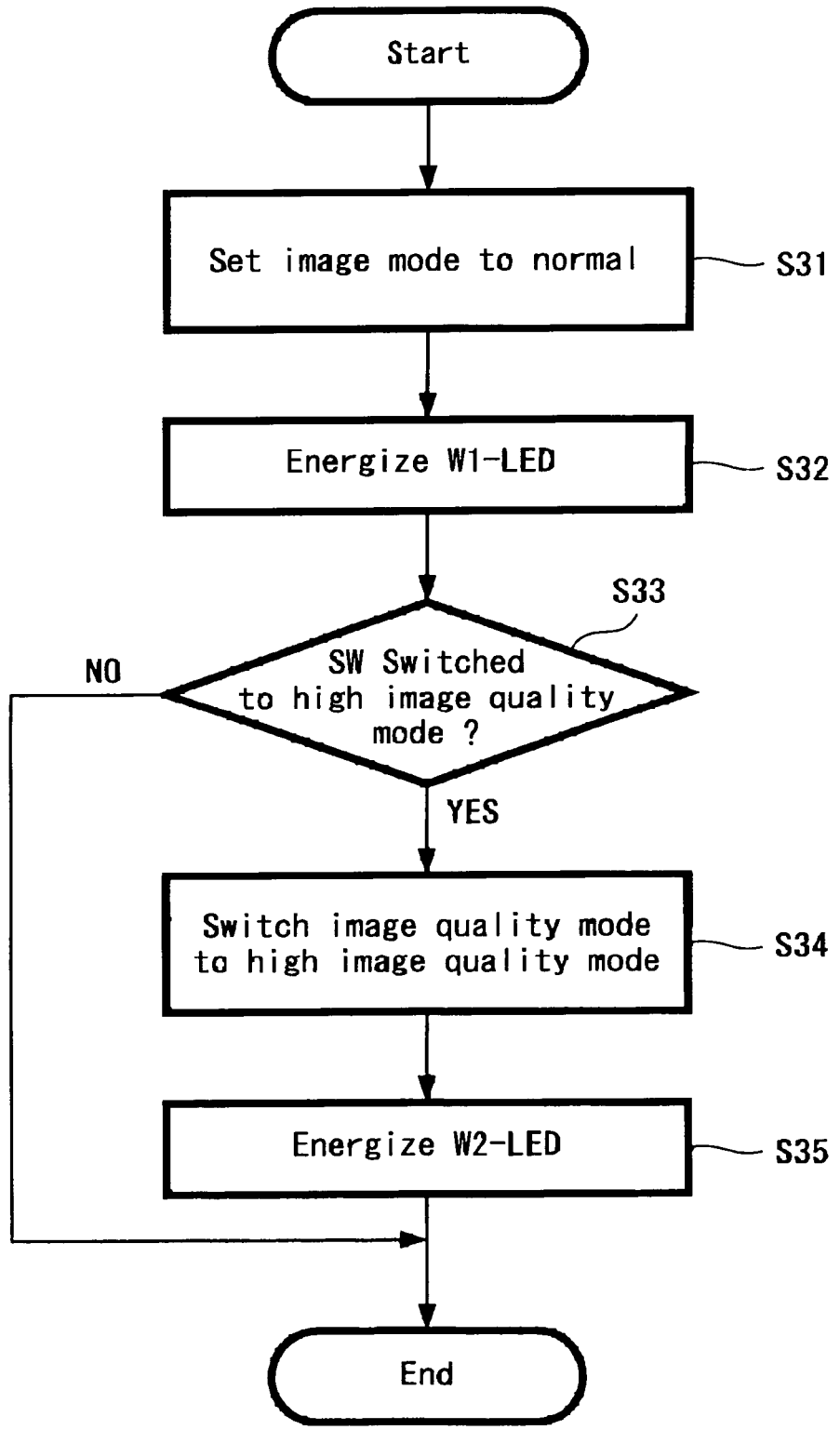
FIG. 21 is a flowchart to which reference will be made in explaining the fourth embodiment of control operations done by a control apparatus of the liquid-crystal display apparatus according to the present invention.
Figure 22:
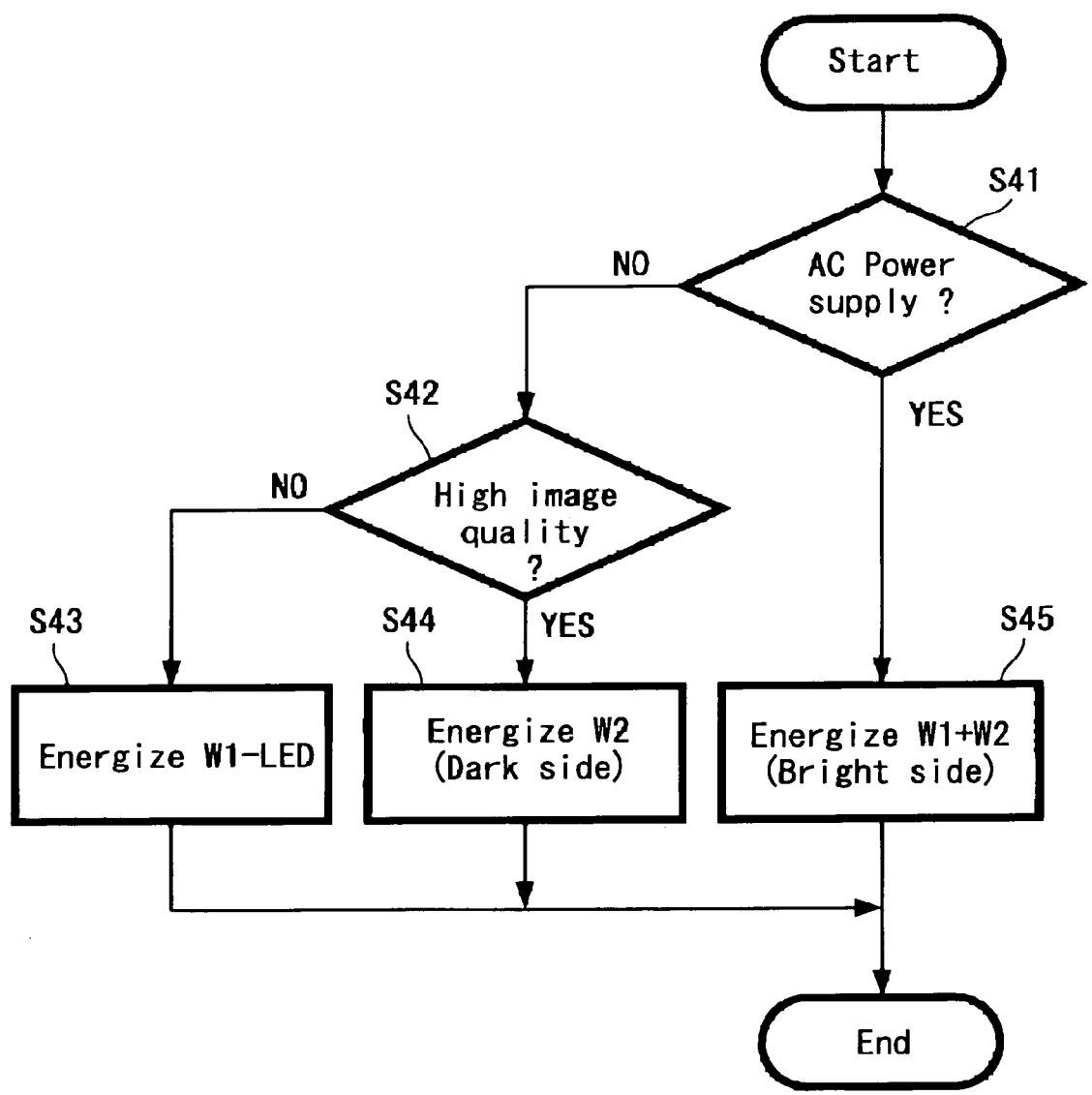
FIG. 22 is a flowchart to which reference will be made in explaining the fifth embodiment of control operations done by a control apparatus of the liquid-crystal display apparatus according to the present invention.
Figure 23:
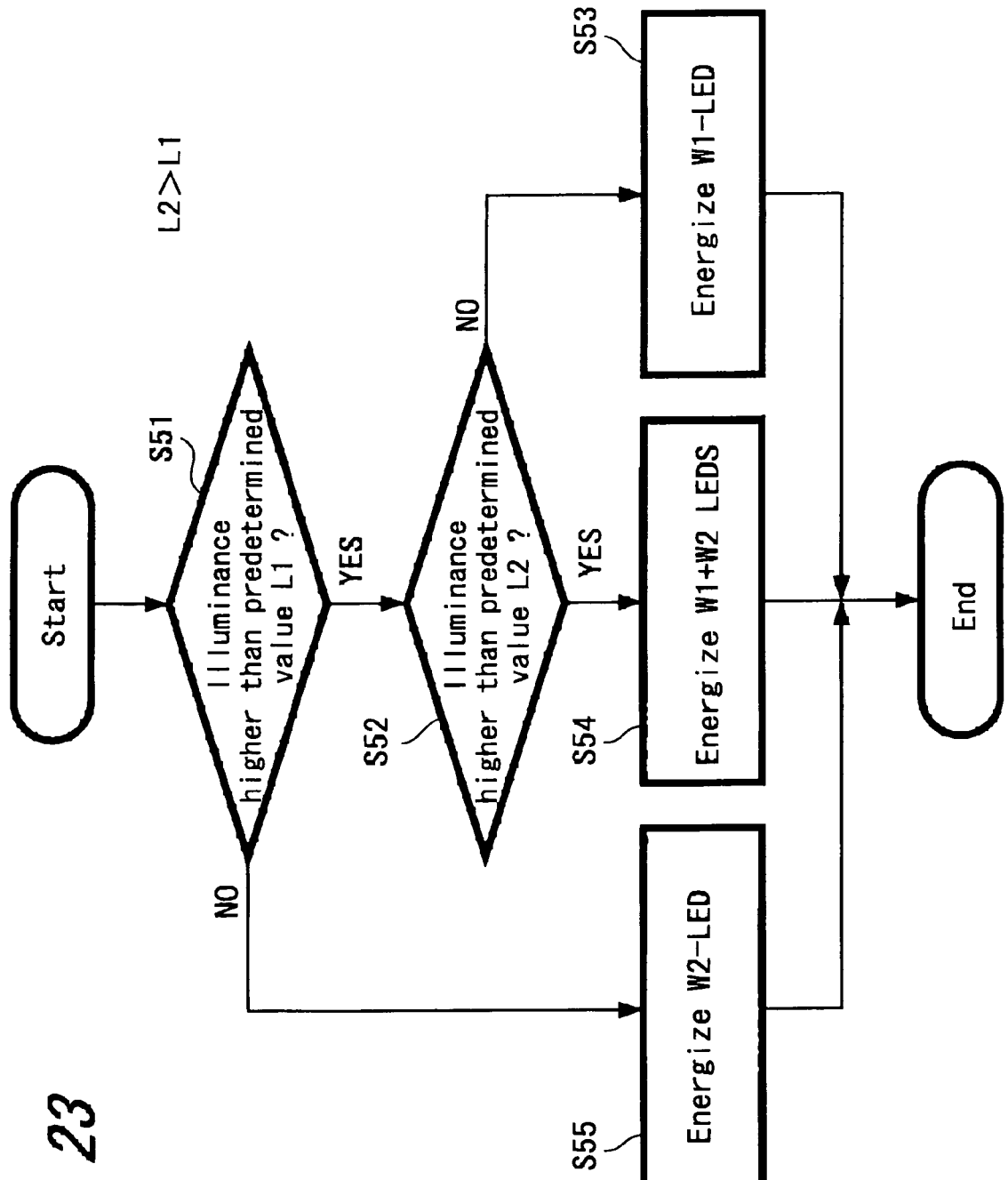
FIG. 23 is a flowchart to which reference will be made in explaining the sixth embodiment of control operations done by a control apparatus of the liquid-crystal display apparatus according to the present invention.
Figure 24:
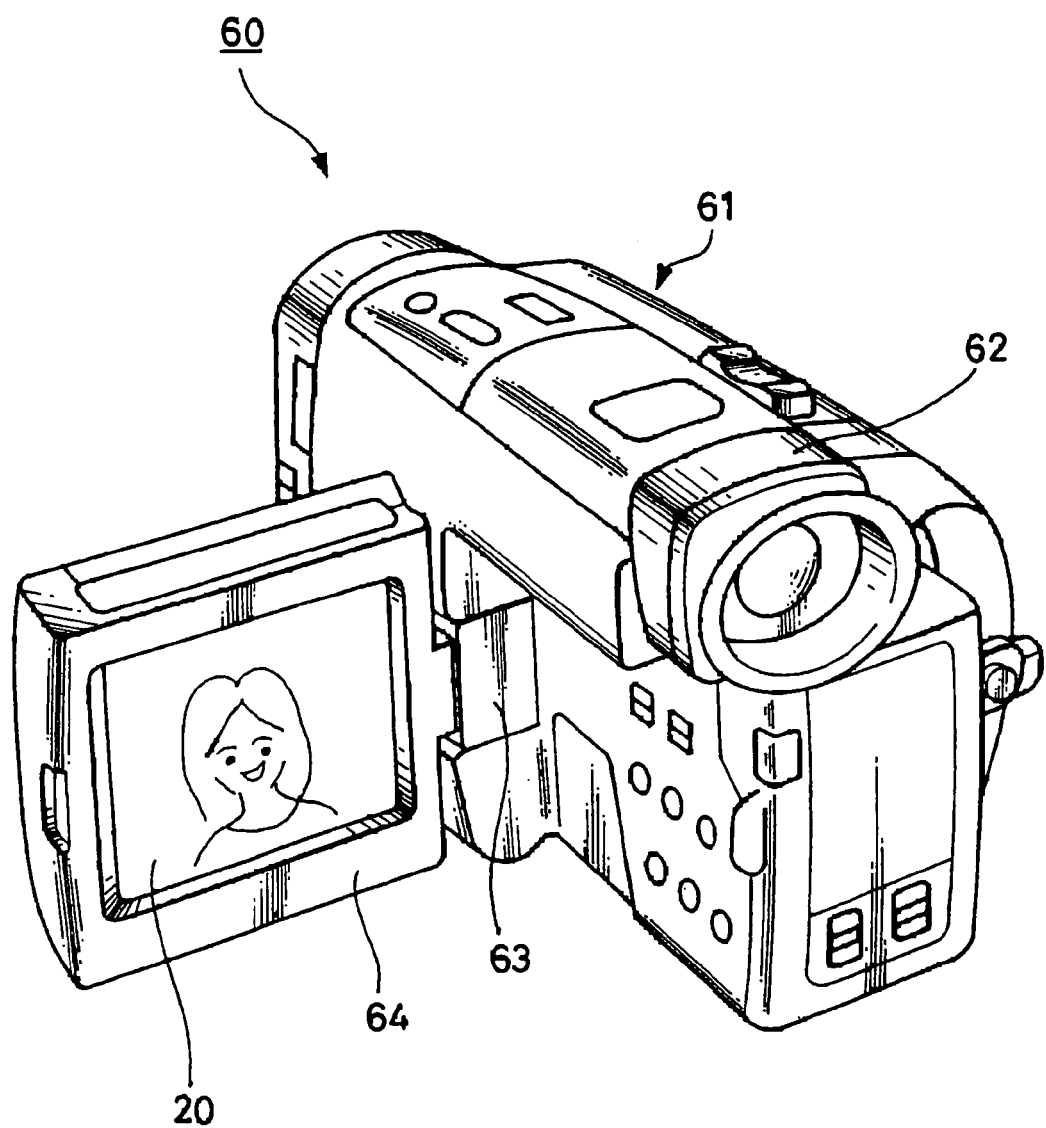
FIG. 24 is an external appearance perspective view showing an image pickup apparatus which is the first embodiment of the electronic device using the liquid-crystal display apparatus according to the present invention.
Figure 25:
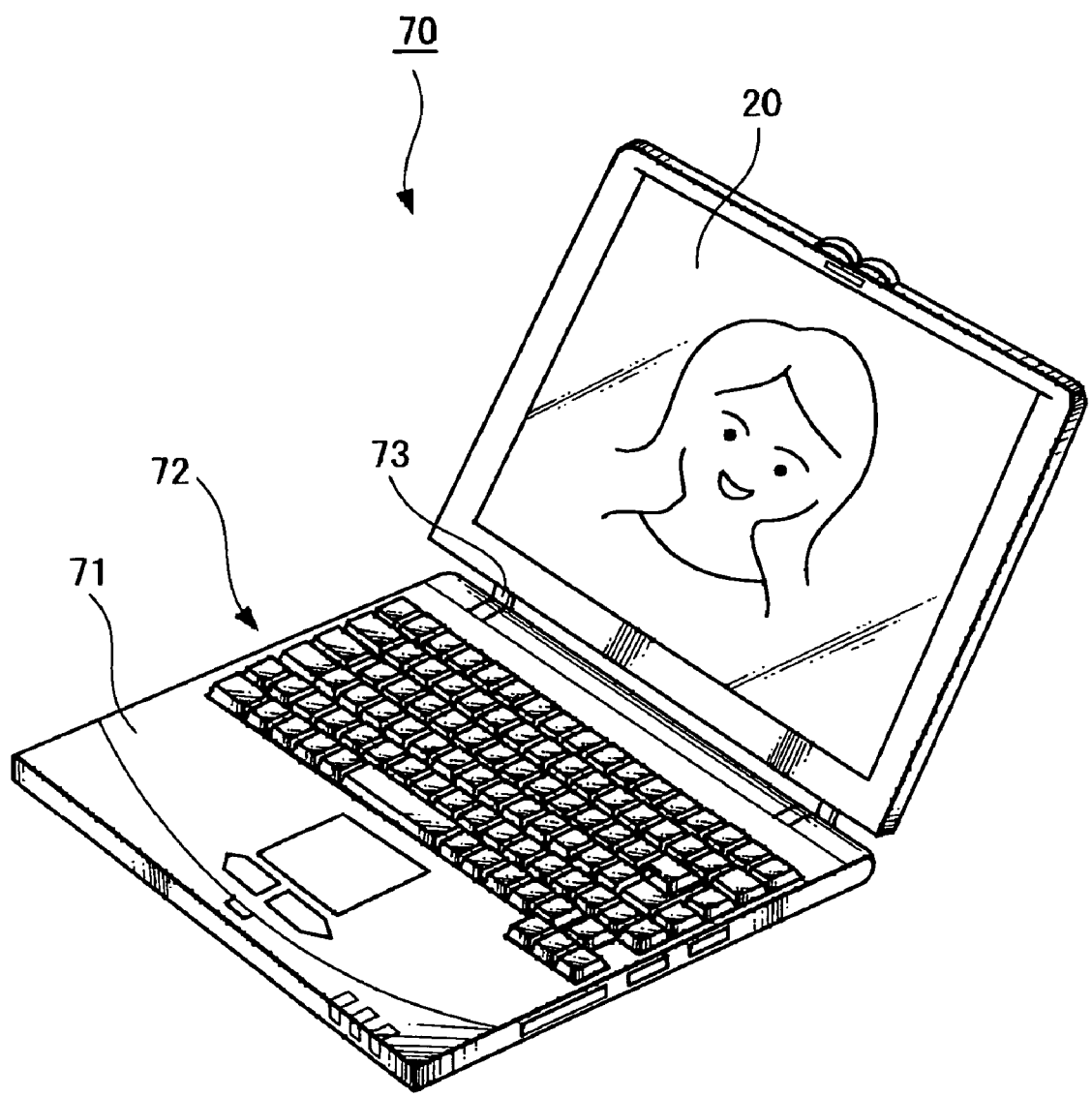
FIG. 25 is an external appearance perspective view showing a notebook type personal computer which is the second embodiment of the electronic device using the liquid-crystal display apparatus according to the present invention.

FIG. 16 is an explanatory diagram showing a schematic arrangement of the second embodiment of the liquid-crystal display apparatus according to the present invention. FIG. 17 is a block diagram showing the embodiment of a power supply circuit for use with the liquid-crystal display apparatus shown in FIG. 16. FIGS. 18A and 18B are explanatory diagrams showing the embodiments of schematic arrangements of white light-emitting diodes constructing the backlight of the liquid-crystal display apparatus shown in FIG. 16, respectively. FIGS. 19A, 19B and 19C are explanatory diagrams showing examples of arrangements of white light-emitting diodes constructing the backlight of the liquid-crystal display apparatus shown in FIG. 16, respectively. FIGS. 20A, 20B and 20C are explanatory diagrams showing examples in which white light-emitting diodes constructing the backlight of the liquid-crystal display apparatus shown in FIG. 16 are energized, respectively. FIGS. 21, 22 and 23 are flowcharts showing examples of control operations done by the control apparatus of the liquid-crystal display apparatus shown in FIG. 6, respectively. FIGS. 24 and 25 are, explanatory diagrams showing the embodiments of the electronic device that uses the liquid-crystal display apparatus according to the present invention, respectively.

As shown in FIG. 6, a liquid-crystal display apparatus 20, which shows the first embodiment of the present invention, is composed of a liquid-crystal panel 21 including a color filter and a backlight 22 serving as a backlight light source to irradiate light of white or lights of more than two colors containing white to this liquid-crystal panel 21. Also, the liquid-crystal panel 21 is composed of a first sheet polarizer 23, a first substrate 24, a liquid-crystal 25, a color filter 26, a second substrate 27 and a second sheet polarizer 28.

The backlight 22 is composed of a first light source to irradiate white light to the liquid-crystal panel 21 and a second light source to irradiate lights of more than two colors containing white to the liquid-crystal panel 21. More specifically, this backlight 22 is composed of light-emitting diodes to emit lights of more than three colors or four colors containing white. In this embodiment, the backlight 22 is composed of light-emitting diodes of four colors and four kinds of a W light-emitting diode 22w of a combination of white (W) and red (R), green (G) and blue (B), which are three primary colors of color, that is, W light-emitting diode 22w capable of emitting light of white (W), a R light-emitting diode 22r capable of emitting light of red (R), a G light-emitting diode 22g capable of emitting light of green (G) and a B light-emitting diode 22b capable of emitting light of blue (B).

The W light-emitting diode 22w can be composed of a combination of a blue light-emitting diode to emit light of blue, for example, and a yellow fluorescent material (for example, a mixture of a red fluorescent material and a green fluorescent material) serving as a filter such as a cover to cover its light-emitting portion. However, the combinations constructing white (W) are not limited to those of this embodiment and it is needless to say that various kinds of combinations can be applied so long as they are able to emit light of white on the whole.

Also, the RGB light-emitting diodes 22r, 22g and 22b of red, green and blue may be light-emitting diodes, each of which is able to emit light of single color, that is, each of which is able to emit light of corresponding color independently. Also, the RGB light-emitting diodes 22r, 22g and 22b may be constructed by adding red, green and blue fluorescent materials to the white light-emitting diode so that they may become able to emit lights of corresponding colors.

Figure 10A:
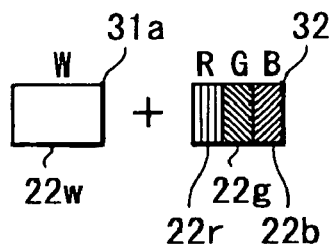
Figure 10B:
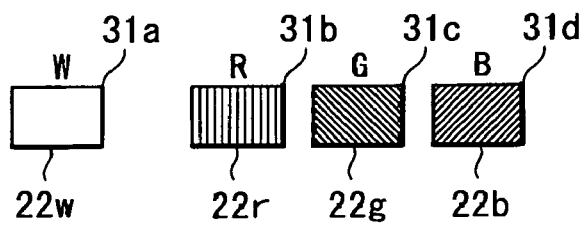

The combinations of the light-emitting diodes of four colors and four kinds may use the applications of various kinds of combinations as shown in FIGS. 10A, 10B, 10C and 10D. FIG. 10B shows the arrangement in which one kind of the light-emitting diode is housed within one package, each one package of the RGBW light-emitting diodes 22r, 22g, 22b and 22w of red, green, blue and white is able to display one kind of color and in which four packages 31a, 31b, 31c and 31d are able to display four kinds of colors.

In this case, when the four kinds of the light-emitting diodes are energized such that emitted lights may not interfere with each other, the respective light-emitting diodes 22r, 22g, 22b and 22w are energized to emit lights of red, green, blue and white so that these red, green, blue and white can be displayed independently. On the other hand, when only the RGB light-emitting diodes 22r, 22g and 22b of red, green and blue of three primary colors are energized such that their emitted lights may interfere with each other, these red, green and blue lights are caused to interfere with each other and hence light of white may be emitted on the whole. At that time, when the W light-emitting diode 22w of white is energized in addition to the RGB light-emitting diodes 22r, 22g and 22b of red, green and blue, the intensity of light of white is increased more than that of white displayed by the RGB light-emitting diodes 22r, 22g and 22b of red, green and blue so that white may become bright on the whole. As compared with this bright white, the white formed by the three RGB light-emitting diodes 22r, 22g and 22b may become white of which intensity is insufficient. Thus, the intensities of two lights of white become different.

FIG. 10A shows the arrangement in which the W light-emitting diode 22w of white is composed of one package and the remaining three kinds of the RGB light-emitting diodes 22r, 22g and 22b of red, green and blue are housed within one package so that two packages 31a and 32 may become able to display four kinds of colors. In this case, when the RGB light-emitting diodes 22r, 22g and 22b of red, green and blue housed within one package are energized at the same time or when they are energized sequentially at a predetermined time interval, lights emitted from the RGB light-emitting diodes 22r, 22g and 22b may interfere with each other so that light of white may be emitted on the whole. On the other hand, when any one of the RGB light-emitting diodes 22r, 22g and 22b of red, green and blue is energized in the package 32, the whole of the package 32 becomes a light-emitting diode of color corresponding to the thus emitted light to emit only such color.

Figure 10C:
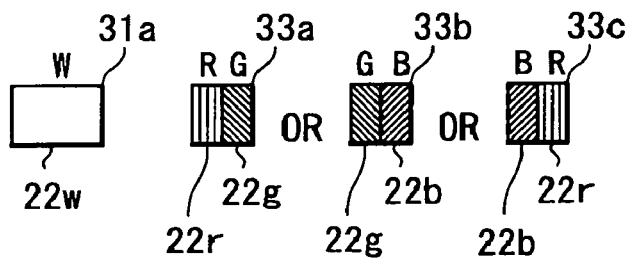

FIG. 10C shows the arrangement in which the W light-emitting diode 22w of white is housed within one package, and two of the RGB light-emitting diodes 22r, 22g and 22b of red, green and blue of the remaining three kinds are housed within one package so that four kinds of colors can be displayed by three packages. In this embodiment, the R light-emitting diode 22r and the G light-emitting diode 22g are housed within the first package 33a, the G light-emitting diode 22g and the B light-emitting diode 22b are housed within the second package 33b and the B light-emitting diode 22b and the R light-emitting diode 22r are housed within the third package 33c.

In this case, of the three kinds of packages 33a, 33b and 33c, any two kinds of packages can be used. Then, the RGB light-emitting diodes 22r, 22g and 22b of red, green and blue housed within the two kinds of packages are energized to emit lights at the same time or they are sequentially energized to emit lights at a predetermined time interval, whereby these lights interfere with each other to emit light of white on the whole. In that case, only any one of the two light-emitting diodes of the same color may be used. In the two kinds of packages (any two of the packages 33a, 33b and 33c), when one of the RGB light-emitting diodes 22r, 22g and 22b of red, green and blue is energized to emit light, the above package becomes the light-emitting diode of the color corresponding to the emitted light and the above light is emitted from this light-emitting diode.

When the R light-emitting diode 22r and the G light-emitting diode 22g of the first package 33a are energized to emit lights at the same time, there may be obtained light of yellow (Y) which is a mixed color of red (R) and green (G). Also, when the G light-emitting diode 22g and the B light-emitting diode 22b of the second package 33b are energized to emit lights at the same time, there may be obtained light of cyan (C) which is a mixed color of green (G) and blue (B). Then, when the B light-emitting diode 22b and the R light-emitting diode 22r of the third package 33c are energized to emit lights at the same time, there may be obtained magenta (M) which is a mixed color of blue (B) and red (R).

Figure 10D:
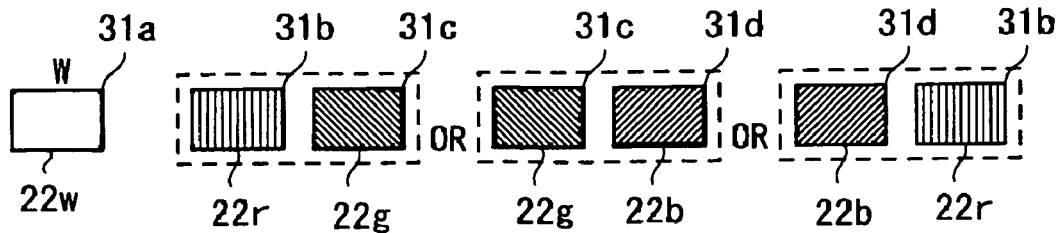

FIG. 10D shows the arrangement in which each of the RGBW light-emitting diodes 22r, 22g, 22b and 22w of four kinds containing white is housed within one package so that colors of four kinds can be displayed by the five packages 31a, 31b, 31c and 31d. This embodiment shows a modified example of the combination shown in FIG. 10C and in which one package is divided into two packages which are used in the same manner. More specifically, when the RGB light-emitting diodes 22r, 22g and 22b of the three kinds of the packages except, white and overlapping one color are energized to emit lights at the same time or when they are sequentially energized to emit lights at a predetermined time lag, lights emitted from the RGB light-emitting diodes 22r, 22g and 22b interfere with each other to emit light of white on the whole. Then, when light emitted from the W light-emitting diode 22w of white is added to the above emitted light of white, light of white with larger intensity can be displayed.

The white package 31a including the above-described W light-emitting diode 22w constructs a first light source which irradiates white light to the liquid-crystal panel 21. Also, the combination of the color package 32 including the RGB light-emitting diodes 22r, 22g and 22b and the white package 31a constructs a second light source for irradiating lights of more than two colors containing light of white to the liquid-crystal panel 21.

FIGS. 11A, 11B and 11C show the embodiments of the arrangements of the first and second light sources having the aforementioned arrangements. More specifically, the embodiments shown in FIGS. 11A, 11B and 11C are the embodiments using the package arrangement shown in FIG. 10A and they illustrate the examples of the arrangements of the light-emitting diodes obtained when the backlight is constructed by using the W light-emitting diode 22w of white and a three-in one package in which the RGB light-emitting diodes 22r, 22g and 22b of the three kinds are housed within one package. In this case, it is needless to say that various factors such as a ratio of quantities of white and other colors (red, green and blue), and arrangements of those colors may not be limited to those of the embodiments which will follow.

FIG. 11A shows the embodiment in which one white package including the W light-emitting diode 22w and one color package including the RGB light-emitting diodes 22r, 22g and 22b are alternately located to construct the backlight. In the case of the embodiment shown in FIG. 11A, since the white package 31a and the color package 32 are used at the same ratio, although clearness of color of red, green and blue is slightly decreased, power consumption of the white package 31a is small so that the liquid-crystal display apparatus may become able to operate with low power consumption for a long period of time.

FIG. 11B shows the embodiment in which the white package 31a and the color package 32 are repeatedly located with a ratio of 1:2. In the case of this embodiment, since the number of the color packages 32 is twice as large as the number of the white packages 31a, clearness of colors of red, green and blue can be increased. On the other hand, power consumption of the color package 32 is larger than that of the white package 31a so that power consumption of the liquid-crystal display apparatus may be increased unavoidably.

FIG. 11C shows the embodiment in which a ratio between the white packages 31a and the color packages 32 is set to 1:3, thus the ratio of the color packages 32 being increased more. In the case of this embodiment, since the number, of the color packages 32 is three times as large as that of the white packages 31a, clearness of colors of red, green and blue can be increased more but power consumption is unavoidably increased in proportion to the increase of the clearness of colors. The white packages 31a and the color packages 32 may be arrayed on the same straight line or the same plane.

FIGS. 12A, 12B and 12C show the embodiments of the modes in which the backlight light source having the above-mentioned arrangement is energized and de-energized. FIG. 12A shows the state in which the light-emitting diodes of four colors, in total, of three colors (red, green and blue) of the white package 31a and the color package 32 are all energized to emit lights in the second light source. In this case, light of white is directly radiated from the white package 31a and light of white, generated when three colors of red, green and blue were mixed, is radiated from the color package 32.

According to this energizing mode, lights of white are emitted from all of the white packages 31a and the color packages 32. As a result, since all packages become white light sources to emit lights of white, the backlight light source can increase the intensity of light as the backlight and hence the whole of the backlight can exhibit an illumination function with the largest intensity. This energizing mode is suitable for the case in which the liquid-crystal display apparatus is in use at the indoor in the brightest state, for example.

FIG. 12B shows the state in which light-emitting diodes of three colors, in total, of red, green and blue of all color packages 32 are all energized while all of the white packages 31a are de-energized in the second light source. In this case, lights of white, generated when three colors of red, green and blue were mixed, are emitted from only all of the color packages 32. According to this energizing mode, the liquid-crystal display apparatus can demonstrate an illumination function which can emit light of clear color while color reproduction of the color package 32 is being regarded as being important. This energizing mode is suitable for the case in which the liquid-crystal display apparatus is in use at the indoor in the darkness, for example.

FIG. 12C shows the state in which all white packages 31a are all energized (this state shows the first light source) while all color packages 32 are de-energized in the second light source. In this case, light of white is radiated from only all of the white packages 31a. According to this energizing mode, the liquid-crystal display apparatus can demonstrate an illumination function with small power consumption while the intensity of light (or electric power) is being regarded as being important. This energizing mode is suitable for the case in which the liquid-crystal display apparatus is in use at the outdoor, for example.

As described above, the second light source and the first light source are switched in energizing mode in response to the environment under which this liquid-crystal display apparatus is in use. More specifically, when it is intended to maintain a large color reproducing range, the color packages 32 are energized. Also, when it is intended to increase illuminance, the white packages 31 (color packages 32 may be added, if necessary) are energized so that it becomes possible to realize switching of high image quality (wide color reproducing range) and high outdoor visibility in response to the mobile environment.

Figure 1:
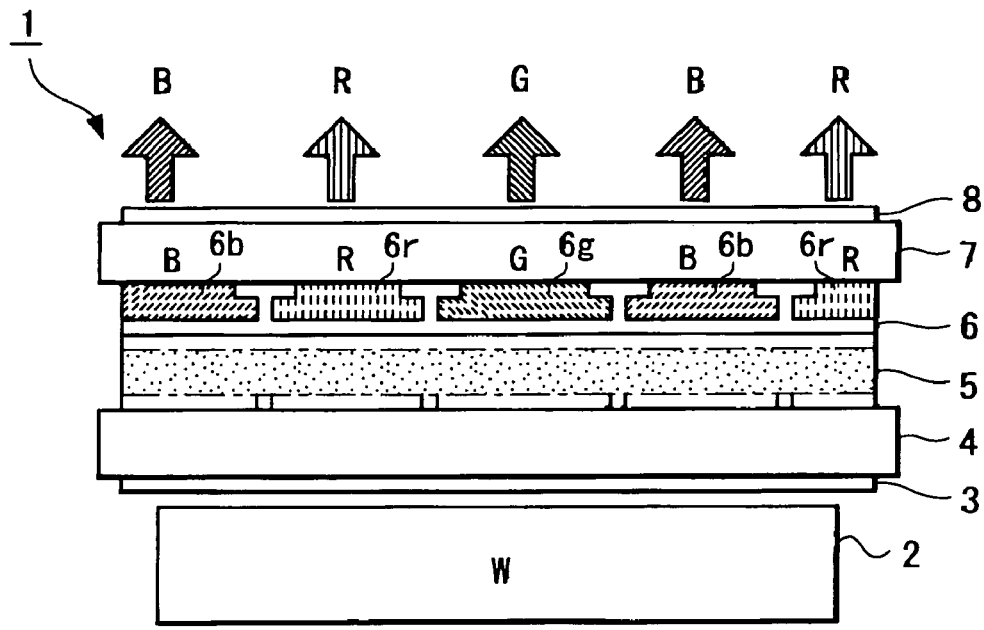
FIG. 1 is an explanatory diagram showing a first example of a liquid-crystal display apparatus according to the related art.
Figure 2:
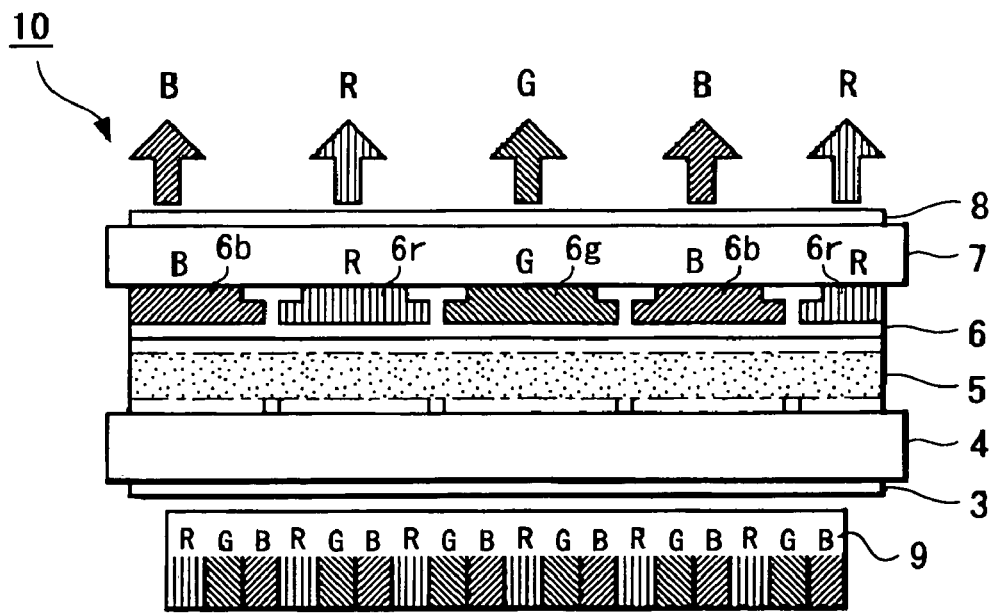
FIG. 2 is an explanatory diagram showing a second example of a liquid-crystal display apparatus according to the related art.
Figure 3A:
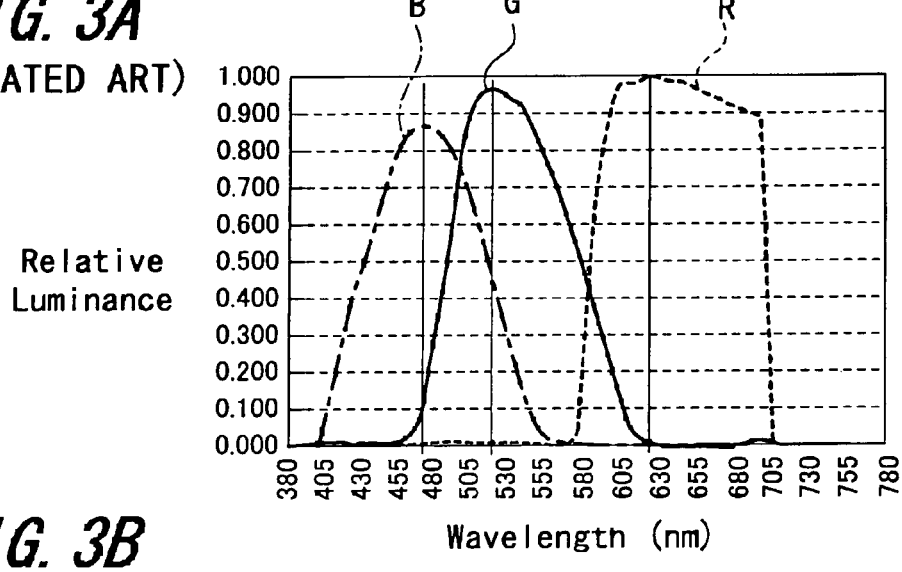
Figure 3B:
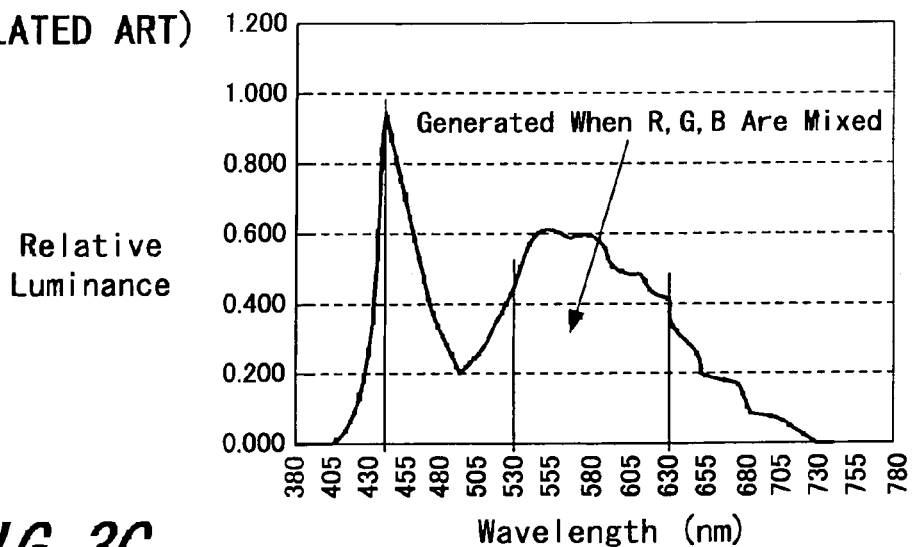
Figure 3C:
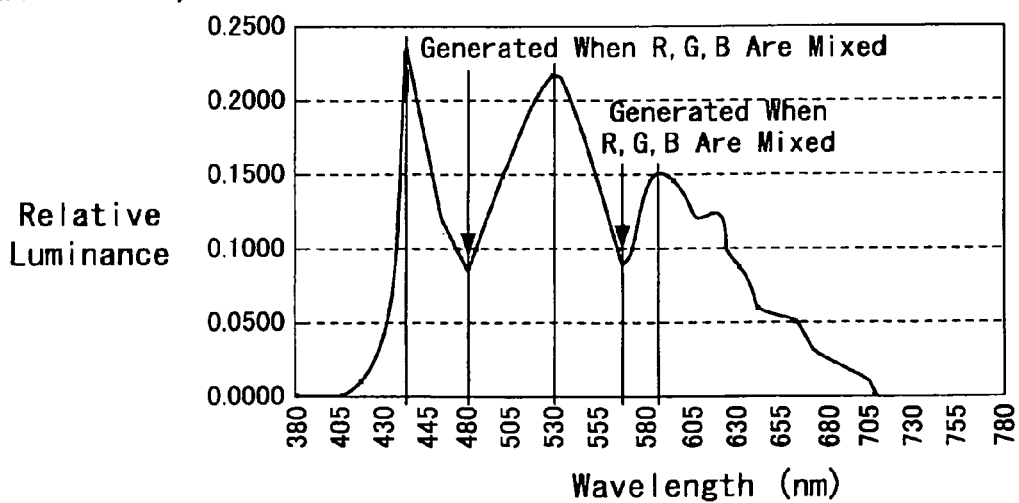
Figure 4A:
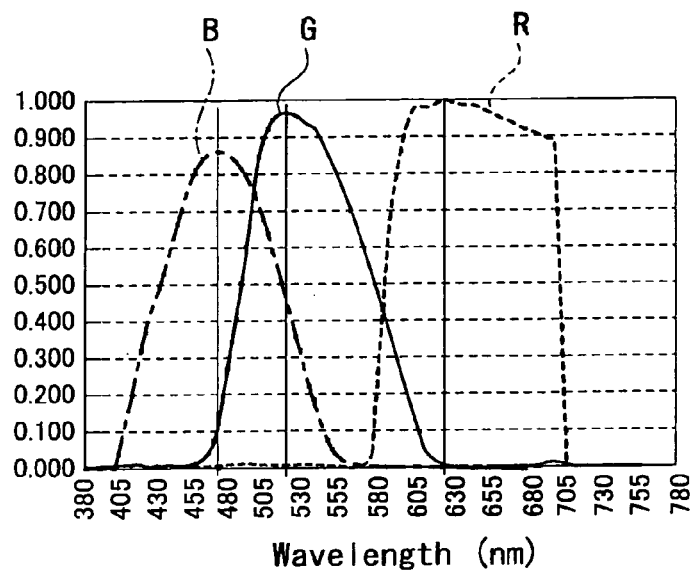
Figure 4B:
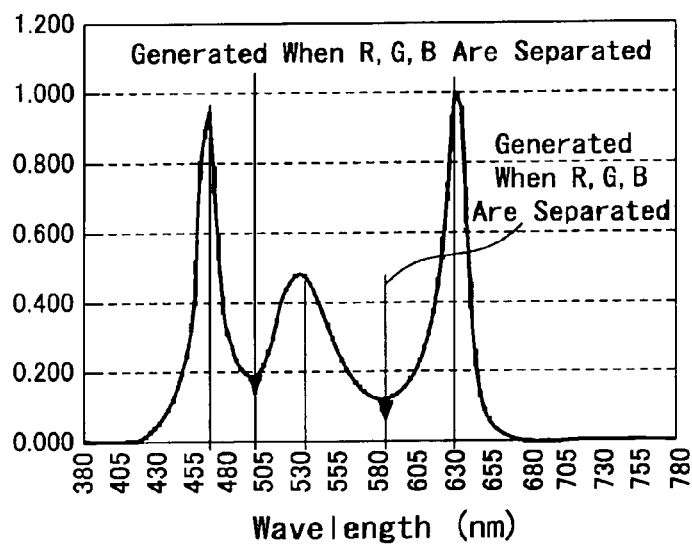
Figure 4C:
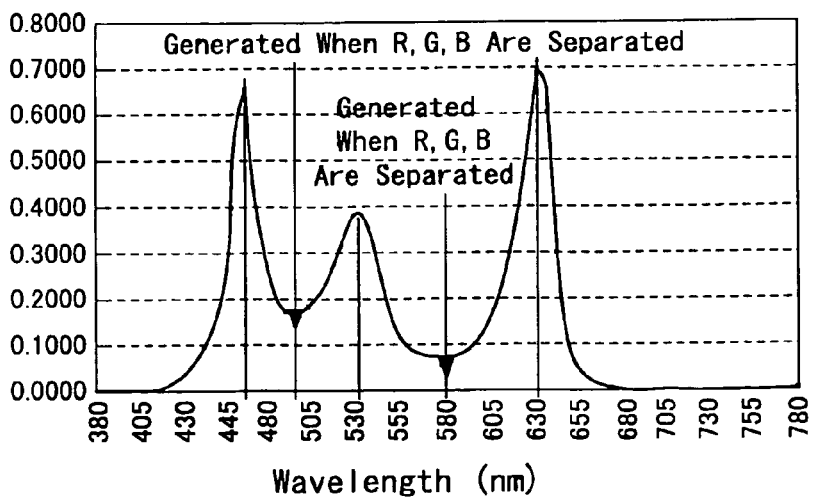
Figure 5:
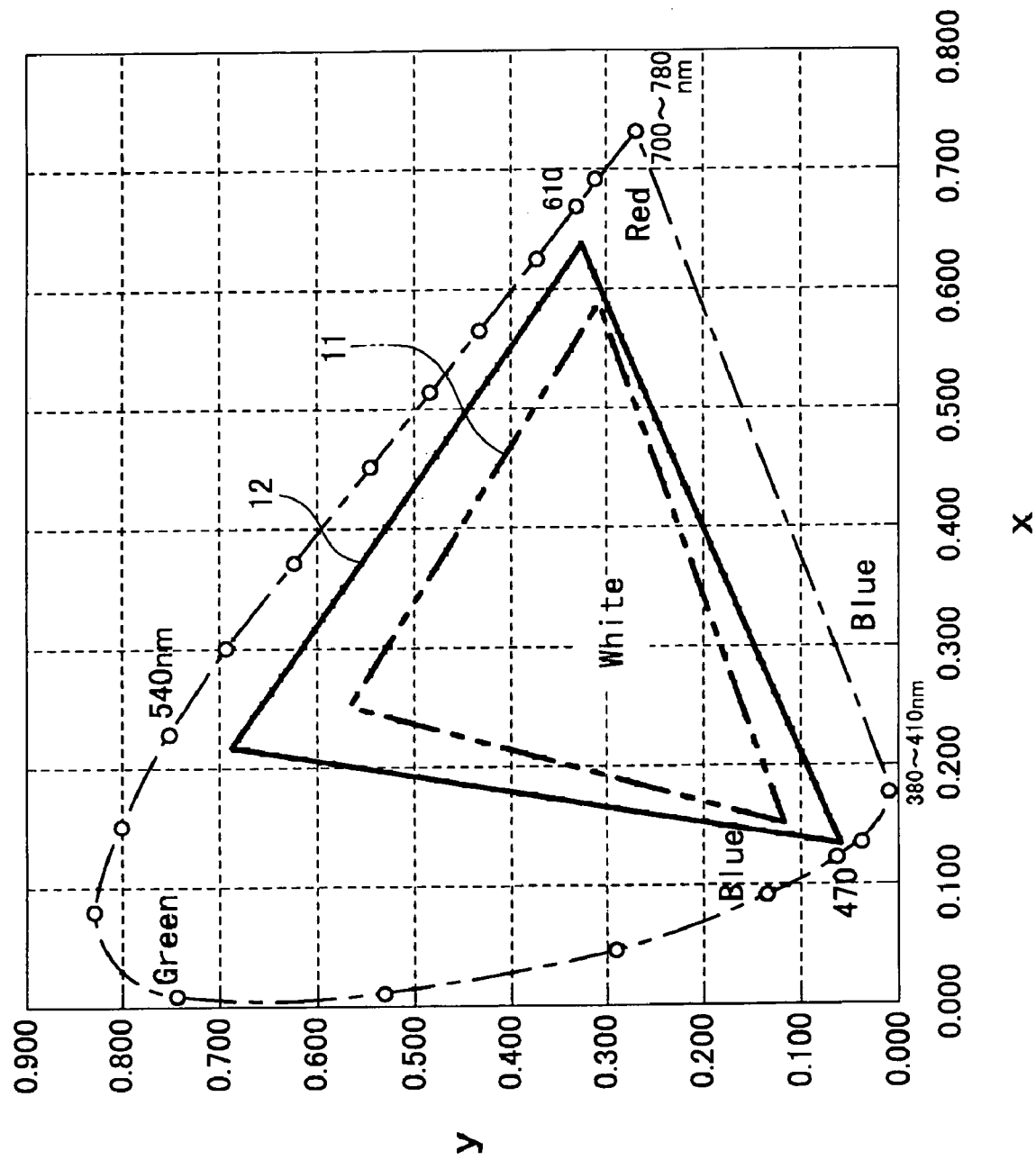
FIG. 5 is an explanatory diagram showing color reproducing regions in a CIE chromaticity diagram.

The arrangement of the liquid-crystal panel 21 to which light is irradiated by the backlight 22 having the above-mentioned arrangement is similar to that shown in FIG. 2. As shown in FIG. 6, the liquid-crystal panel 21 is composed of the first sheet polarizer 23, the first substrate 24, the liquid crystal 25, the color filter 26, the second substrate 27 and the second sheet polarizer 28 located, in that order, from the side of the backlight 22.

The first and second sheet polarizers 23 and 28 are polarizers having planes of polarization which can be rotated 90 degrees. The first sheet polarizer 23 is bonded to one surface of the first substrate 24, and the second sheet polarizer 28 is bonded to one surface of the second substrate 27. The first and second substrates 24 and 27 are formed of glass plates in which transparent electrodes of predetermined shape are attached to one surfaces thereof and thereby formed as one body. The respective transparent electrodes of the first and second substrates 24 and 27 are provided on the surface opposite to the side of the two sheet polarizers 23 and 28. The liquid crystal 25 having the color filter 26 is interposed between the surfaces in which those transparent electrodes are provided.

The liquid crystal 25 is formed of stick-like organic molecules and it is able to switch the dark state and the bright state based on the presence of a voltage by utilizing electric anisotropy such as permittivity and conductivity and optical anisotropy such as refractive index. One transparent electrode is located on one surface of this liquid crystal 25 and the color filter 26 is located on the other surface of the liquid crystal 25. Then, the color filter 26 has the other transparent electrode disposed on its surface opposite to the liquid crystal 25. The color filter 26 has the respective filter regions 26r, 26g and 26b of red (R), green (G) and blue (B) disposed thereon in such a manner that they may be continued repeatedly at the same interval in the upper and lower direction and in the right and left direction.

Color purities of three primary colors of red, green and blue of this color filter 26 are different depending on the film thickness of the color filter, concentration of pigment and the like. While the color purities can be improved in accordance with the increase of the concentration value, transmittance of the color filter is lowered so that the display screen becomes dark. With respect to this disadvantage, according to the present invention, the state in which only the white packages 31a serving as the first light source are energized to emit lights is added to the state in which the color packages 32 are energized to emit lights independently of the state in which the white packages 31a serving as the second light source are energized to emit lights so that both of the white packages 31a and the color packages 32 are energized to emit lights. Therefore, lights of sufficiently large quantity of light can be emitted even in the state in which transmittance decreases, the intensity of light can be increased to increase visibility. At the same time, display of colors can be made clear by widening the color reproducing range.

FIG. 7 is a block diagram showing a schematic arrangement of an electronic device 40 including the liquid-crystal display apparatus 20 composed of the liquid-crystal panel 21 and the backlight 22, each of which has the aforementioned arrangement. As shown in FIG. 2, this electronic device 40 is composed of a control unit 41 which is a control apparatus serving as a light source control means as well, a video signal processing unit 42 electrically connected to this control unit 41, a storage apparatus 43 including a program memory and a data memory to drive the control unit 41 and other RAM (random-access memory) and ROM (read-only memory), a luminance sensor 44 which shows a first specific example of an illuminance detecting means to detect ambient luminance of the liquid-crystal panel 21 to output a detected signal, a white balance sensor 45 which shows a second specific example of an illuminance detecting means to detect ambient illuminance of the liquid-crystal panel 21 to output a detected signal and the like.

The control unit 41 is composed of an operation circuit including a microcomputer (CPU (central processing unit)), for example, and so on. A liquid-crystal driving unit 46 is connected to the video signal processing unit 42 and the liquid-crystal panel 21 is connected to the liquid-crystal driving unit 46. A first connection terminal 40a of the electronic device 40 is connected to this video signal processing unit 42 and a video signal is inputted to the electronic device 40 from external devices through the first connection terminal 40a. Also, the control unit 41 is connected to a second connection terminal 40b of the electronic device 40 and a camera correction signal is inputted to the electronic device 40 from the second connection terminal 40b.

Further, the luminance sensor 44 is connected to the control unit 41 through a first interface circuit 48, and luminance information detected by the luminance sensor 44 is inputted to the control unit 41. Also, the white balance sensor 45 is connected to the control unit 41 through a second interface circuit 49, and white balance information detected by the white balance sensor 45 is inputted to the control unit 41. Then, a LED (light-emitting diode) driving unit 47 is connected to the control unit 41 and the first light source 22w and the second light sources 22r, 22g and 22b which construct the backlight 22 is connected to the LED driving unit 47.

FIGS. 8 and 9 are respectively block diagrams showing examples of arrangements of power supply circuits by which the LED driving unit 47, the first light source 22w and the second light sources 22r, 22g and 22b are connected together. A power supply circuit 51 is composed of four kinds of light-emitting diodes, that is, the W light-emitting diode 22w of white and the three kinds of the RGB light-emitting diodes 22r, 22g and 22b of red, green and blue which are individually connected in parallel to each other. The power supply circuit 51 is provided with four make and break switches W-SW, R-SW, G-SW and B-SW in response to the four kinds of the light-emitting diodes. By controlling make and break operations of these make and break switches W-SW, R-SW, G-SW and B-SW, it is possible to properly control the four kinds of the light-emitting diodes in such a manner that each of these light-emitting diodes may be energized to emit light at every color or that these light-emitting diodes of all colors may be energized to emit lights at the same time.

A power supply circuit 52 shown in FIG. 9 is composed of the W light-emitting diode 22w of white and the three kinds of the RGB light-emitting diodes 22r, 22g and 22b of red, green and blues which are individually connected in series. The power supply circuit 52 also is provided with the four make and break switches W-SW, R-SW, G-SW and B-SW in response to the four kinds of the light-emitting diodes. By controlling make and break operations of these make and break switches W-SW, R-SW, G-SW and B-SW, it is possible to properly control the four kinds of the light-emitting diodes in such a manner that each of these light-emitting diodes may be energized to emit light at every color or that these light-emitting diodes of all colors may be energized to emit lights at the same time.

The liquid-crystal panel 21 is not limited to an active matrix LCD (liquid-crystal display) in which switching semiconductor devices and memory device to accumulate signals are disposed within the panel thereof, and a passive matrix LCD which does not include switching semiconductor devices and memory devices and LCDs of other systems can, of course, be applied to the liquid-crystal panel 21. Also, the backlight 22 may be located relative to the liquid-crystal panel 22 by a suitable arrangement system such as a side arrangement system in which the backlight 22 is located at the lateral side of the liquid-crystal panel 21 and a direct arrangement system in which the backlight 22 is located at the rear surface of the liquid-crystal panel 21. It is needless to say that the backlight 22 can be freely located relative to the liquid-crystal panel 21 based on any other arbitrary arrangement systems. Further, the settings (γ correction, settings and selections of colors, correction of colors, etc.) which should be required when a viewer intends to make a desired image on the liquid-crystal display panel 20 can also be switched in synchronism with the mode switching of the backlight 22.

The γ (gamma correction) correction will be described below. "Color reproduction" refers to a degree at which colors of an object can be reproduced with fidelity. "Color reproducibility" refers to "color reproduction including color reproduction characteristics". In general, contrast of an image reproduced by a television receiver is lower than that of an actual object. However, the viewers are able to watch reproduced images without unpleasantness because optimum gradation reproduction lies in reproduction of relative lightness of an original scene. Also, input and output characteristics in which luminance of each portion of an object and luminance of a corresponding portion on a reproduced image are expressed on two logarithmic axes refer to "gradation characteristics". Reproduced state of light and shade of the reproduced images refers to "gradation reproduction". Then, a gradient of a tangential line of each portion in the reproduced state refers to "γ (gamma)".

Figure 26:
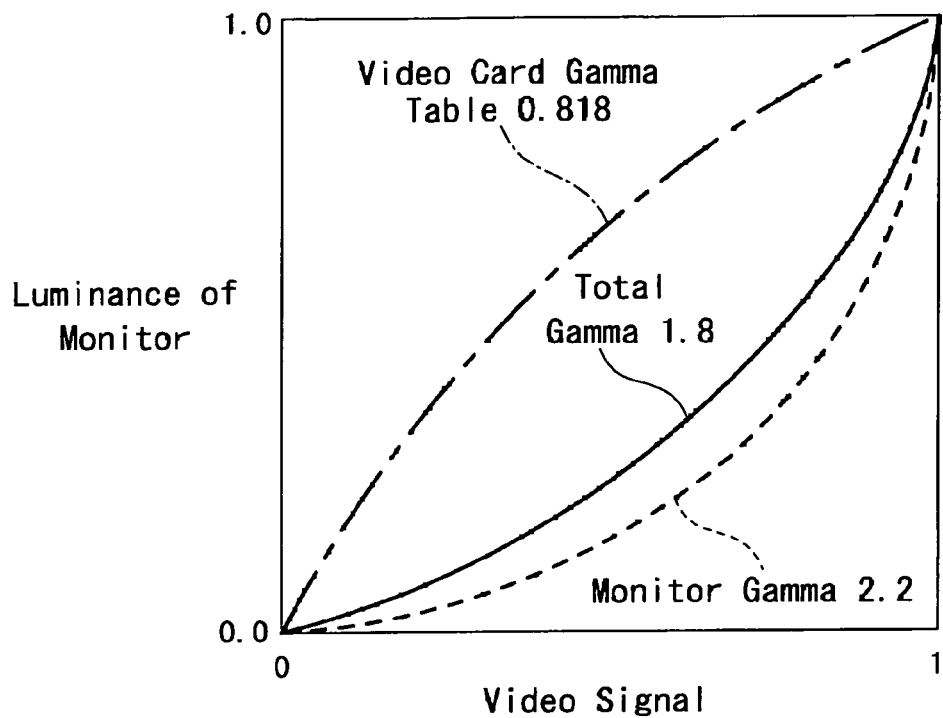
FIG. 26 is a graph useful for explaining γ (gamma) characteristics of monitor gamma and in which the horizontal axis represents a video signal and the vertical axis represents monitor luminance.

In the monitors (liquid-crystal displays, plasma displays, CRT (cathode-ray tube) displays, etc.) of the existing television receivers, a value of γ characteristic (electro-optic transducer characteristic) is generally set to a monitor gamma γ=1.8 to 2.2. The value of the monitor gamma γ can be corrected as a total gamma γ based on characteristics (video card gamma table) of a signal supplied to the monitor as shown in FIG. 26. For example, when a monitor gamma is set to γ=2.2, if a video signal (for example, characteristic is 0.818) having inverse γ characteristics (video card gamma table) is supplied to the monitor, then the total gamma is set to γ=1.8.

Figure 27:
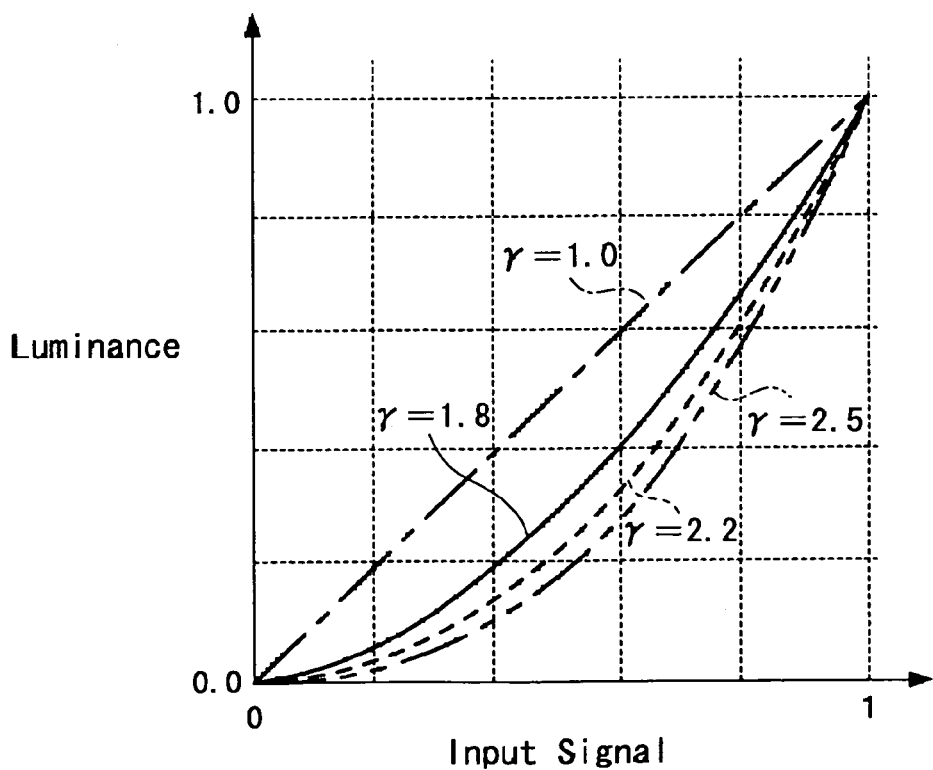
FIG. 27 is a graph used to explain γ (gamma) characteristics of monitor gamma and in which the horizontal axis represents an input signal and the vertical axis represents luminance.

As shown in FIG. 27, when the γ value of this γ correction is increased (for example, γ=2.5), intermediate gradation luminance is decreased (gradation expression power is increased) and hence the screen becomes dark. On the other hand, when the γ value is decreased (for example, γ=1.0), intermediate gradation luminance is increased (gradation expression power is decreased) and hence the screen becomes bright. As described above, when the γ correction is carried out arbitrarily or in accordance with viewer's taste, luminance, visibility and the like of the liquid-crystal display apparatus 20 can be adjusted in accordance with the viewer's taste and therefore the viewer is able to make a desired image on the picture screen of the liquid-crystal display apparatus 20.

FIGS. 13, 14 and 15 are respectively flowcharts showing the embodiments of control operations done by the control unit 41 in the electronic device 40. The control unit 41 is supplied with a luminance detection signal from the luminance sensor 41, a white balance detection signal from the white balance sensor 45, a correction signal and a video signal from the camera. Then, the control unit 41 executes a predetermined calculation processing based on these signals and outputs a control signal to the LED driving unit 47 in response to the calculated result to control lighting of the backlight (first and second light sources) 22. Concurrently with the control of lighting of the backlight 22, the control unit 41 outputs a control signal through the video signal processing unit 42 to the liquid-crystal driving unit 46 to control the liquid-crystal panel 21 so that a predetermined image may be displayed on the liquid-crystal panel 21. However, it is needless to say that the present invention may not be limited to those examples of control operations shown in the flowcharts of FIGS. 13, 14 and 15.

The flowchart of FIG. 13 shows the example of the manner in which the light source of the backlight 22 is controlled while the image quality of the image is being regarded as being important.

Referring to FIG. 13, and following the start of operation, the image mode is set to the normal mode at a step S1. That is, the image quality of the image is matched with the reference image mode which is stored, in advance, in the memory apparatus 43, for example. Then, control goes to the next step S2, whereat the W light-emitting diode 22w of white serving as the first light source is energized (for example, the state shown in FIG. 12C). In this state, since only the W light-emitting diode 22w is energized, a certain degree of intensity of illumination can be maintained and the backlight 22 can be driven at small power consumption. The manner in which illumination is used as described above is effective for the case in which the electronic device 40 is in use at the outdoor.

Then, control goes to the next decision step S3. At the decision step S3, it is determined by the control unit 41 whether or not the image quality mode is switched to the high image quality mode. This decision can be carried out by checking whether or not a change-over switch, which changes-over the image quality mode to the high image quality mode or to the normal image quality mode, is operated. If the image quality mode is not switched to the high image quality mode as represented by a NO at the decision step S3, then control is ended. If on the other hand the image quality mode is switched to the high image quality mode as represented by a YES at the decision step S3, then control goes to the next step S4.

At the step S4, the image quality mode is switched to the high image quality mode. Then, control goes to the next step S5. In this step S5, the RGB light-emitting diodes 22r, 22g and 22b of the three kinds of red, green and blue are energized at the same time (for example, the state shown in FIG. 12A). In the state presented at the step S5, white light generated by the RGB light-emitting diodes 22r, 22g and 22b is added to white light generated by the W light-emitting diode 22w which was already energized. As a consequence, lights of white from both of the first and second light sources are superimposed upon each other to obtain illumination of extremely large intensity. Therefore, the color filter 26 of the liquid-crystal panel 21 can be irradiated with light of extremely large intensity. Accordingly, color reproducibility can be increased extremely and predetermined colors can be displayed clearly. Then, control is ended.

The flowchart of FIG. 14 shows the example of the manner in which the light source of the backlight is controlled based on the kind of the power supply.

Referring to FIG. 14, and following the start of operation, it is determined at the next decision step S11 by the control unit 41 whether or not the power supply of the electronic device 40 is an AC power supply. That is, it is determined at the decision step S11 whether the electronic device 40 is used at home in which electric power can be sufficiently supplied to the electronic device 40 or the electronic device 40 is driven at the outdoor with supply of electric power from a portable power supply. If the power supply is not the AC power supply as represented by a NO at the decision step S11, that is, the electronic, device 40 is driven at the outdoor by electric power from the portable power supply, then control goes to the next decision step S12.

It is determined at the decision step S12 by the control unit 41 whether or not the image quality is the high image quality mode. In, this decision at the step S12, the backlight 22 is switched to the first light source or the second light source based on good or bad of image quality. If the image quality is not the high image quality mode as represented by a NO at the decision step S12, then control goes to the next step S13, whereat the W light-emitting diode 22w serving as the first light source is energized (for example, the state shown in FIG. 12C). At that time, in the state shown at the step S13, since only the W light-emitting diode 22w is energized, the backlight 22 can be driven at small power consumption for a long time period while illumination of a certain degree of intensity being maintained. The manner in which such illumination of the backlight 22 is used is effective for the case in which the electronic device 40 is in use at the outdoor under natural light of extremely large intensity. Then, control is ended.

If on the other hand the image quality is the high image quality mode as represented by a YES at the decision step S12, then control goes to the next step S14 whereat the RGB light-emitting diodes 22r, 22g and 22b of the three kinds of red, green and blue are energized at the same time (for example, the state shown in FIG. 12B). Then, control is ended. In the state shown at the step S14, white light is emitted by the RGB light-emitting diodes 22r, 22g and 22b of the three kinds. In this state, of the second light source, only the RGB light-emitting diodes 22r, 22g and 22b of the three kinds are energized to generate illumination of large intensity. This illumination becomes slightly darker than illumination of extremely large intensity obtained when light of white generated by energizing the W light-emitting diode 22w is added to the above-mentioned white light. In this illumination mode, since the color filter 26 of the liquid-crystal panel 21 can be irradiated with light of ordinary intensity, it is possible to extend an illumination time by suppressing the increase of power consumption while high color reproducibility is being maintained.

Also, if the power supply is the AC power supply as represented by a YES at the decision step S11, that is, if the electronic device 40 is connected to an outlet and driven at the indoor by electric power of a house-service power supply, then control goes to the next step S15. In this step S15, all of four kinds, in total, of RGBW light-emitting diodes 22r, 22g, 22b and 22w of the RGB light-emitting diodes 22r, 22g and 22b and the W light-emitting diode 22w are energized (for example, the state shown in FIG. 12A). As a consequence, the W light-emitting diode 22w and the RGB light-emitting diodes 22r, 22g and 22b are energized to emit lights of white, red, green and blue at the same time and white lights generated when they are energized at the same time are superimposed upon each other, thereby resulting in illumination of extremely large intensity. Accordingly, the color filter 26 of the liquid-crystal panel 21 can be irradiated with illumination light of extremely large intensity and hence display with high color reproducibility and of which color is clear can be realized. Then, control is ended.

The flowchart of FIG. 15 shows the example of the manner in which the light source of the backlight 22 is controlled based on the detected value from the illuminance detection sensor.

Referring to FIG. 10, and the following the start of operation, it is determined at the next decision step S21 by the control unit 41 whether or not ambient illuminance of the liquid-crystal display apparatus 20 is higher than a first predetermined value L1 which becomes a first reference value. In this decision, it is determined based on the ambient illuminance of the liquid-crystal display apparatus 20 attached to the electronic device 40 whether the electronic device 40 is in use in the bright place such as outdoor or the electronic device 40 is in use in the dark place such as indoor. Based on the detected results of the ambient illuminance, the intensity of the light on the backlight 22 may be controlled in response to the situations under which the electronic device 40 is placed.

In the decision of this decision step S21, to be more concrete, the value of the luminance detection signal detected by the luminance sensor 44 and the value of the white balance detection signal detected by the white balance sensor 45 are compared with the previously-set first predetermined value L1 which is stored in a suitable storage means such as the memory 43, and it is determined whether or not at least one of the two detected values is higher than the first predetermined value L1. In this case, if the electronic device 40 is placed in the relatively dark place such as the indoor, then it is determined that the value of the detected illuminance is lower than the first predetermined value L1. Conversely, if the electronic device 40 is placed in the relatively bright place such as the outdoor, then it is determined that the value of the detected illuminance is higher than the first predetermined value L1.

If it is determined at the decision step S21 based on the compared result by the control unit 41 that the value of the detected illuminance is higher than the first predetermined value L1 (as represented by a YES), that is, if the electronic device 40 is placed in the bright place, then control goes to the next decision step S22, whereat the above detected value is compared with a second predetermined value L2 which is a second reference value. In the decision at this step S22, it is determined whether the display screen of the liquid-crystal display apparatus 20 should be made brighter in the relatively bright place such as the outdoor or the display screen of the liquid-crystal display apparatus 20 should be kept dark.

If it is determined at the decision step S22 based on the compared result by the control unit 41 that the detected value is lower than the second predetermined value L2 (as represented by a NO), then control goes to the next step S23, whereat the W light-emitting diode 22w serving as the first light source is energized (for example, the state shown in FIG. 12C). At that time, in the state of the step S23, since only the W light-emitting diode 22w is energized, the backlight 22 can be driven at small power consumption for a long period of time while a certain degree of intensity of illuminance is being maintained. The manner in which such illumination is used is effective for the case in which the electronic device 40 is in use at the outdoor with full of natural light of which intensity is extremely large. Then, control is ended.

If on the other hand the detected value is higher than the second predetermined value L2 as represented by a YES at the decision step S22, then control goes to the next step S24, whereat all of four kinds, in total, of the RGBW light-emitting diodes 22r, 22g, 22b and 22w of the RGB light-emitting diodes 22r, 22g and 22b and the W light-emitting diode 22w are energized (for example, the state shown in FIG. 12A). As a consequence, the W light-emitting diode 22w and the RGB light-emitting diodes 22r, 22g and 22b are energized to emit lights of white, red, green and blue at the same time and white lights generated when they are energized at the same time are superimposed upon each other, thereby resulting in illumination of extremely large intensity. Accordingly, the color filter 26 of the liquid-crystal panel 21 can be irradiated with illumination light of extremely large intensity and hence display with high color reproducibility and of which color is clear can be realized.

If on the other hand the detected value is lower than the first predetermined value L1 as represented by a NO at the decision step S21, then control goes to the next step S25, whereat the three kinds of the RGB light-emitting diodes 22r, 22g and 22b are energized (for example, the state shown in FIG. 12B). As a result, of the second light source, only the RGB light-emitting diodes 22r, 22g and 22b of the three kinds are energized to generate illumination of large intensity. This illumination becomes slightly darker than illumination of extremely large intensity obtained when light of white generated by energizing the W light-emitting diode 22w is added to the above-mentioned white light. In this illumination mode, since the color filter 26 of the liquid-crystal panel 21 can be irradiated with light of ordinary intensity, it is possible to extend an illumination time by suppressing the increase of power consumption while high color reproducibility is being maintained. Then, control is ended.

FIG. 16 shows the second embodiment of the liquid-crystal display apparatus according to the present invention. A liquid-crystal display apparatus 80 is different from the liquid-crystal display apparatus 20 according to the above-described embodiment only in a backlight 82 that serves as a backlight light source. Accordingly, only the arrangement of the backlight 82 will be described. In FIG. 16, elements and parts identical to those of the preceding embodiment are denoted by identical references numerals and therefore need not be described.

As shown in FIG. 16, the backlight 82 is composed of a first light source for irradiating first white light W1 to the liquid-crystal panel 21 and a second light source for irradiating second white light W2, different from the first white light W1, to the liquid-crystal panel 21. The first light source is a first white light-emitting body 82a (W1) for emitting the first white light W1. The first white light-emitting body 82a can be constructed by a combination of a blue light-emitting diode and a yellow fluorescent material. Specifically, the first white light-emitting body 82a has an arrangement shown in FIG. 18A and it includes a B light-emitting diode 83 for emitting light of blue (B) and a yellow fluorescent material 84, located on the front surface of the light-emitting portion of this B light-emitting diode 83 and which emits light of white with irradiation of blue light (B) radiated from the light-emitting portion.

The circumference of the light-emitting portion of the B light-emitting diode 83 is covered with the yellow fluorescent material 84 and a reflection layer 84 for reflecting light is attached to the back surface of the yellow fluorescent material 84. The reflection layer 86 is shaped like a curved surface, which can reflect light efficiently, such as a spherical surface or a light-receiving surface of a parabolic antenna. This reflection layer 86 is held by a base member 87 of which plane shape is substantially square. The B light-emitting diode 83 is located at approximately the central portion of this base member 87 and the above-mentioned elements and members are integrally formed as one body to thereby construct the first white light-emitting body 82a.

The second light source is a second white light-emitting body 82b (W2) for emitting second white light W2 and it can be constructed by a combination of a single color light-emitting diode and a mixed fluorescent material. The second white light-emitting body 82b can be constructed by a single color light-emitting diode for emitting light of arbitrary single color and a mixed fluorescent material located on the front surface of the light-emitting portion of the single color light-emitting diode and which is formed by mixing more than two fluorescent materials which can emit white light with irradiation of single color light radiated from the light-emitting portion.

The following combinations, for example, can be applied to the combination of the single color light-emitting diode and the mixed fluorescent material. When a blue light-emitting diode is used as the single color light-emitting diode, a red/green mixed fluorescent material, made by mixing a red fluorescent material and a green fluorescent material, can be applied to the above combination. When a red light-emitting diode is used as the single color light-emitting diode, a green/blue mixed fluorescent material, made by mixing a green fluorescent material and a blue fluorescent material, can be applied to the above combination. When a green light-emitting diode is used as the single color light-emitting diode, a red/blue mixed fluorescent material, made by mixing the red fluorescent material and the blue fluorescent material, can be applied to the above combination.

Also, a three-color mixed fluorescent material can be constructed by mixing fluorescent materials of three colors. For example, while the blue light-emitting diode is used as the single color light-emitting diode, a red/green/magenta mixed fluorescent material, made by mixing a red fluorescent material, a green fluorescent material and a magenta fluorescent material, can be applied to the above three-color mixed fluorescent material. Further, the combination of the single color light-emitting diode and the mixed fluorescent material is not limited to these embodiments and it is needless to say that any combination of the single color light-emitting diode and the mixed fluorescent material can be applied to the present invention insofar as it can be colored white with irradiation of light from the light-emitting diode. It is needless to say that a mixed color fluorescent material can be formed by mixing fluorescent materials of more than four colors.

The second white light-emitting body 82b has an arrangement shown in FIG. 18B. The second white light-emitting body 82b shown in FIG. 18B shows a specific example of the second white light-emitting body and it includes a B light-emitting diode 83 for emitting light of blue (B) and a red/green mixed fluorescent material 85 which can be colored white with irradiation of the blue light (B) radiated from this B light-emitting diode 83. The circumference of the light-emitting portion of the B light-emitting diode 83 is covered with the red/green mixed fluorescent material 85 and the reflection layer 86 is attached to the back surface of the red/green mixed fluorescent material 85. The reflection layer 86 is shaped like a curved surface, which can reflect light efficiently, such as a spherical surface or a light-receiving surface of a parabolic antenna. This reflection layer 86 is held by the base member 87 of which plane shape is substantially square. The B light-emitting diode 83 is located at approximately the central portion of this base member 87 and the above-mentioned elements and members are integrally formed as one body to thereby construct the second white light-emitting body 82b.

FIGS. 19A, 19B and 19C show the embodiments of the manners in which the first white light-emitting body (first light source) 82a having the aforementioned arrangement and the second white light-emitting body (second light source) 82b having the aforementioned arrangement are located, respectively. It is needless to say that, in these embodiments, a ratio between the number of the white light-emitting body 82a and the number of second white light-emitting body 82b, arrangements thereof and the like may not be limited to those of the following embodiments. Further, similarly to the above-described embodiments, a liquid-crystal display apparatus that is combined with the backlight is not limited to the active matrix and it can include a simple matrix and other types of matrix. Similarly, the layout of the backlight may be a side arrangement system and the direct arrangement system and other arrangement systems can be applied to the layout of the backlight. Then, the settings ($\gamma$ correction, correction of colors, etc.) which should be required when a viewer intends to make a desired image on the liquid-crystal display panel 20 can also be switched in synchronism with the mode switching of the backlight 22.

FIG. 19A shows the embodiment in which first white light-emitting bodies 82a and the second white light-emitting bodies 82b are alternately located to construct the backlight. In the case of the embodiment shown in FIG. 19A, since the first white light-emitting bodies 82a and the second white light-emitting bodies 82b are used at the same ratio, although color reproducibility (image quality) of light emitted from the second white light-emitting body 82b is slightly lowered, visibility (luminance) by which the viewer can watch the image at the outdoor under light emitted from the first white light-emitting body 82a can be increased and power consumption can be alleviated.

FIG. 19B shows the embodiment in which the first white light-emitting bodies 82a and the second white light-emitting bodies 82b are repeatedly located at the ratio of 1:2 to construct the backlight. In the case of this embodiment, since the number of the second white light-emitting bodies 82b is twice as large as that of the first white light-emitting bodies 82a, color reproducibility (image quality) of light emitted from the second white light-emitting body 82b can be improved. On the other hand, it is unavoidable that electric power consumed by the second white light-emitting body 82b is increased a little.

FIG. 19C shows the embodiment in which the ratio between the first white light-emitting bodies 82a and the second white light-emitting bodies 82b is set to 1:3, thereby resulting in the ratio of the second white light-emitting bodies 82b being increased more. In the case of this embodiment, since the number of the second white light-emitting bodies 82b is three times as large as that of the first white light-emitting bodies 82a, color reproducibility (image quality) can be improved more. On the other hand, it is unavoidable that power consumption is increased. The first white light-emitting bodies 82a and the second white light-emitting bodies 82b are located on the same straight line or on the same plane.

FIGS. 20A, 20B and 20C show embodiments of lighting modes (energized mode and de-energized mode) of the backlight light source having the above-mentioned arrangement, respectively. FIG. 20A shows the embodiment of the state in which all of the first white light-emitting bodies 82a and the second white light-emitting bodies 82b are energized at the same time. In this case, the first white light W1 and the second white light W2 are radiated from both of the first white light-emitting body 82a and the second white light-emitting body 82b. According to this energizing mode, since all of the first white light-emitting bodies 82a and the second white light-emitting bodies 82b become white light sources to emit white light, luminance of the backlight light source serving as the backlight can be increased to the maximum and the whole of the backlight can exhibit the brightest illumination function. This energizing mode is suitable for the case in which the liquid-crystal display apparatus is in use in the brightest state at the indoor, for example.

FIG. 20B shows the embodiment of the state in which all of the white light-emitting bodies 82a are de-energized, while all of the second white light-emitting bodies 82b are energized. In this case, the second white light W2 formed of white lights from only the second white light-emitting bodies 82*b* is radiated from the backlight. According to this energizing mode, the backlight can exhibit the illumination function to reproduce clear colors while color reproduction done by the second white light W2 from the second white light-emitting body 82*b* is being regarded as being important. This energizing mode is suitable for the case in which the liquid-crystal display apparatus is in use in the dim state at the indoor, for example.

FIG. 20C shows the embodiment of the state in which all of the second white light-emitting bodies 82*b* are de-energized, while all of the first white light-emitting bodies 82*a* are energized. In this case, the first white light W1 formed of white lights from only the first white light-emitting bodies 82*a* is radiated from the backlight. According to this energizing mode, the backlight can exhibit the illumination function with small power consumption while luminance (or electric power) of the first white light W1 of the first white light-emitting body 82*a* is being regarded as being important. This energizing mode is suitable for the case in which the liquid-crystal display panel is in use at the outdoor, for example.

As described above, the energizing modes of the first white light-emitting body 82*a* and the second white light-emitting body 82*b* are switched in response to the environments under which this liquid-crystal display apparatus is in use. That is, when a large color reproduction range is maintained, the second white light-emitting bodies 82*b* are energized. Also, when luminance is increased, it is possible to realize high image quality (wide color reproduction range) and high outdoor visibility in response to mobile environments by energizing the first white light-emitting bodies 82*a* (second white light-emitting bodies 82*b* may be added, if necessary).

The arrangement of the liquid-crystal panel 21 to which light is irradiated from the backlight 82 having the above-mentioned arrangement is similar to that shown in FIG. 6. As shown in FIG. 16, the liquid-crystal panel 21 is composed of the first sheet polarizer 23, the first substrate 24, the liquid-crystal panel 25, the color filter 26, the second substrate 27 and the second sheet polarizer 28 located, in that order, from the side of the backlight 82.

FIG. 12 shows the embodiment of an electric circuit using the above-mentioned first and second white light-emitting bodies 82*a* and 82*b* as a light source thereof. A power supply circuit 81 shown in FIG. 17 includes a plurality of first white light-emitting bodies 82*a* and a plurality of second white light-emitting bodies 82*b* individually connected in series. As shown in FIG. 17, the power supply circuit 81 includes a make and break switch 88 (SWa and SWb) which can separately open and close a power supply circuit of the first white light-emitting bodies 82*a* connected in series and a power supply circuit of the second white light-emitting diode 82*b* similarly connected in series. By controlling open and close operations of this make and break switch 88, it is possible to properly control the energizing modes in such a manner as to separately energize the first white light-emitting bodies 82 and the second white light-emitting bodies 82*b* or to energize both of the first white light-emitting bodies 82*a* and the second, white light-emitting bodies 82*b* at the same time.

Flowcharts shown in FIGS. 21, 22 and 23 illustrate a second embodiment of the manner in which the backlight 82 is controlled by the control unit 41 of the electronic device 40 including the power supply circuit 81. Similarly to the above-described embodiment, the control unit 41 is supplied with the luminance detection signal from the luminance sensor 44, the white balance detection signal from the white balance sensor 45, a correction signal and a video signal from the camera and hence the control unit 41 executes a predetermined calculation processing based on these signals. Then, the control unit 41 outputs a control signal to the LED driving unit 47 in response to the calculated result to control the first white light-emitting body 82*a* and the second white light-emitting body 82*b*. Concurrently with this control operation of lighting, the control unit 41 outputs a control signal through the video signal processing unit 42 to the liquid-crystal driving unit 46 to control the liquid-crystal panel 21 so that a predetermined picture is displayed on the liquid-crystal panel 21. However, it is needless to say that the second embodiment of the present invention is not limited to the examples of the control operations shown in FIGS. 21, 22 and 23.

The flowchart shown in FIG. 21 shows the example of the manner in which the backlight 82 is controlled while image quality of an image is regarded as being important.

Referring to FIG. 21, and following the start of operation, control goes to a step S31, whereat the image mode is set to the normal mode. That is, the image quality of the image is set to the reference image mode that is previously stored in the memory apparatus 43. Then, control goes to the next step S32, whereat the first white light-emitting body 82*a* serving as the first light source is energized (for example, the state shown in FIG. 20C). In this state, since only the first white light-emitting body 82*a* is energized, the backlight 22 can be driven while illumination of a certain degree of illuminance is being maintained by the first white light W1. The manner in which illumination is used as described above is effective for the case in which the electronic device 40 is in use at the outdoor.

Then, control goes to the next decision step S33, whereat it is determined whether or not the image quality mode is switched to the high image quality mode. This decision may be carried out by checking whether or not the changeover switch, which switches the image quality mode to the high image quality mode or to the normal image quality mode, is changed-over. If the image quality mode is not switched to the high image quality mode as represented by a NO at the decision step S33, then control is ended. If on the other hand the image quality mode is switched to the high image quality mode as represented by a YES at the decision step S33, then control goes to the next step S34.

At the step S34, the image quality mode is switched to the high image quality mode. Then, control goes to the next step S35. In this step S35, the second white light-emitting body 82*b* serving as the second light source is energized (for example, the state shown in FIG. 20A). In the state shown at the step S35, the second white light W2 generated from the second white light-emitting body 82*b* is added to the first white light W1 generated from the first white light-emitting body 82*a* that was already energized. As a consequence, the two kinds, of the light sources are energized at the same time and white lights from the two light sources are superimposed upon each other to generate illumination of extremely high intensity. Therefore, since the color filter 26 of the liquid-crystal panel 21 can be irradiated with illumination of light of extremely high intensity, color reproducibility can be improved and hence predetermined colors can be displayed clearly. Then, control is ended.

The flowchart shown in FIG. 22 shows the example of the manner in which the backlight 82 is controlled based on the kind of the power source.

Referring to FIG. 22, and following the start of operation, it is determined at the next decision step S41 whether or not the power supply of the electronic device 40 is the AC power supply. That is, in this decision at the step S41, it is determined whether the electronic device 40 is in use at home in which the electronic device 40 can be driven by sufficient electric power or the electronic device 40 is driven at the outdoor by electric power from the portable power supply. If the power supply is not the AC power supply, that is, if the electronic device 40 is driven at the outdoor by electric power from the portable power supply as represented by a NO at the decision step S41, then control goes to the next decision step S42.

It is determined at the decision step S42 whether or not the image quality mode is the high image quality mode. That is, in the decision at this step S42, the backlight 82 is switched to the first light source or to the second light source based on good or bad of the image quality. If the image quality mode is not the high image quality mode as represented by a NO at the decision step S42, then control goes to the next step S43, whereat the first white light-emitting body 82*a* serving as the first light source is energized (for example, the state shown in FIG. 20C). At that time, in the state shown at the step S43, since only the first white light-emitting body 92*a* is energized, the backlight 82 can be operated with small power consumption for a long time period while illumination of a certain degree of intensity is being maintained by the first white light W1. The manner in which illumination is used as described above is effective for the case in which the electronic device 40 is in use at the outdoor under natural light with extremely large intensity. Then, control is ended.

If on the other hand the image quality mode is the high image quality mode as represented by a YES at the decision step S42, then control goes to the next step S44, whereat the second white light-emitting body 82*b* serving as the second light source is energized (for example, the state shown in FIG. 20B). In the state shown at the step S44, since only the second white light-emitting diode 82*b* is energized, although illumination of large intensity is obtained by the second white light W2, this illumination obtained by the second white light W2 becomes a little darker as compared with illumination of extremely large intensity obtained when white light generated by energizing the first white light-emitting body 82*a* is added to the second white light W2. In this illumination mode, since the color filter 26 of the liquid-crystal panel 21 can be irradiated with light of ordinary intensity, an illumination time can be extended by suppressing the increase of power consumption while high color reproducibility is being maintained. Then, control is ended.

Also, if the power supply is the AC power supply as represented by a YES at the decision step S41, that is, if the electronic device 40 is connected to the outlet at the indoor and it is driven by electric power from the home power supply, then control goes to the next decision step S45. At this step S45, all of the first white light-emitting bodies 82*a* and the second white light-emitting bodies 82*b* are energized at the same time (for example, the state shown in FIG. 20A). As a consequence, since the first white light-emitting bodies 82*a* and the second white light-emitting bodies 82*b* are energized at the same time, white lights generated by the first white light W1 and the second white light W2 are superimposed upon each other to generate illumination of extremely large intensity. Consequently, the color filter 26 of the liquid-crystal panel 21 can be irradiated with illumination light of extremely large intensity and hence display with high color reproducibility and of which colors are clear can be realized. Then, control is ended.

The flowchart shown in FIG. 23 shows the example of the manner in which the backlight 82 is controlled based on detected values of the sensor which detect illuminance.

Referring to FIG. 23, and following the start of operation, control goes to the next decision step S51, whereat it is determined whether or not ambient illuminance of the liquid-crystal display apparatus 20 is higher than a first predetermined value L1 which becomes a first reference value. Specifically, it is determined based on the ambient illuminance of the liquid-crystal display apparatus 20 attached to the electronic device 40 whether the electronic device 40 is in use in the bright place such as the outdoor or the electronic device 40 is in use in the dark place such as the indoor. Then, illumination of the backlight 82 may be controlled based on the detected results of illuminance in response to the situations under which the electronic device 40 is placed.

The decision at this step S51 will be described more concretely. That is, at the decision step S51, the value of the luminance detection signal detected by the luminance sensor 44 and the value of the white balance detection signal detected by the white balance sensor 45 are compared with the first predetermined value L1 previously set and which is stored in a suitable memory means such as the memory 43. Then, it is determined whether or not at least one of the two detected values of the luminance detection signal and the white balance detection signal is higher than the first predetermined value L1. In this case, if the electronic device 40 exits in the relatively dark place such as the indoor, then it is determined that the value of the detected illuminance is lower than the predetermined value L1. Conversely, if the electronic device 40 exists in then relatively bright place such as the outdoor, then it is determined that the value of the detected illuminance is higher than the first predetermined value L1.

If the value of the detected illuminance is higher than the first predetermined value L1 as represented by a YES at the decision step S51, then control goes to the next decision step S52. At the decision step S52, the detected value is compared with a second predetermined value L2 which is a second reference value. To be more concrete, it is determined at the decision step S52 whether the display screen of the liquid-crystal display apparatus 20 should be made brighter in the relatively bright place such as the outdoor or the display screen of the liquid-crystal display apparatus 20 should remain dark in the relatively bright place such as the outdoor.

If the detected value is lower than the second predetermined value L2 as represented by a NO at the decision step S52, then control goes to the next step S53, whereat the first white light-emitting bodies 82*a* serving as the first light source are energized (for example, the state shown in FIG. 20C). At that time, in the state shown at the step S53, since only the first white light-emitting bodies 82*a* are energized, the backlight 82 can be driven with small power consumption for a long time period while illumination of a certain degree of intensity generated by the first white light W1 is being maintained. The manner in which illumination is used as described above is effective for the case in which the electronic device 40 is in use at the outdoor under natural light of extremely large intensity. Then, control is ended.

If on the other hand the detected value is higher than the second predetermined value L2 as represented by a YES at the decision step S52, then control goes to the next step S54, whereat all of the first white light-emitting bodies 82*a* and the second white light-emitting bodies 82*b* serving as the second light source are energized (for example, the state shown in FIG. 20A). As a result, since the first white light-emitting bodies 82a and the second white light-emitting bodies 82b are energized at the same time, white lights generated by the white light W1 and the second white light W2 are superimposed upon each other to generate illumination of extremely large intensity. As a consequence, the color filter 26 of the liquid-crystal panel 21 can be irradiated with illumination light of extremely large, intensity and hence display with high color reproducibility and of which colors are bright and clear can be realized. Then, control is ended.

Also, if the detected value is lower than the first predetermined value L1 as represented by a NO at the decision step S51, then control goes to the next decision step S55, whereat the second white light-emitting bodies 82b are energized (for example, the state shown in FIG. 20B). As a result, since only the second white light-emitting bodies 82b are energized, although bright illumination is obtained by the second white light W2, the above illumination becomes a little dark as compared with illumination of extremely large intensity obtained when white light generated by energizing the first white light-emitting bodies 82a is added to the second white light W2. In this illumination mode, since the color filter 26 of the liquid-crystal panel 21 can be irradiated with light of ordinary intensity, it is possible to extend an illumination, time by suppressing the increase of power consumption while high color reproducibility is being maintained.

FIGS. 24 and 25 are respectively perspective view showing specific examples of electronic devices that can use the liquid-crystal display apparatus 20 having the above-mentioned arrangement and which can achieve the above-mentioned actions and effects. FIG. 24 shows the specific example in which the electronic device according to the present invention is applied to an image pickup apparatus such as a video camera. An image pickup apparatus, generally depicted by reference numeral 60 in FIG. 24, includes a camera body 61, the liquid-crystal display apparatus 20 attached to the camera body 61 so as to become freely rotatable and the like.

As shown in FIG. 24, the camera body 61 is formed of a hollow casing shaped like substantially a rectangular prism. The camera body 61 houses in its inside a lens apparatus capable of shooting an object, a recording apparatus (for example, a disc drive apparatus, a tape drive apparatus, etc.) capable of recording images obtained by the lens apparatus, a control apparatus for controlling driving of these lens apparatus and the recording apparatus and the like. This camera body 61 has attached thereto two kinds of display apparatus of an electronic viewfinder 62 and the liquid-crystal display apparatus 20, each of which can display images of an object. The electronic viewfinder 62 is attached to the upper portion of the camera body 61 so as to become freely rotatable. That is, the electronic viewfinder 62 can raise its rear side in the upper direction around its front side.

Further, as shown in FIG. 24, the liquid-crystal display apparatus 20 is rotatably attached to one side surface of the camera body 61 by a biaxial rotation mechanism 63. The liquid-crystal display apparatus 20 is stored in a flat cover member 64 which is opened to one surface. The cover member 64 is supported to the camera body 61 by a first rotary shaft portion of the biaxial rotation mechanism 63 such that the cover member 64 can be rotated freely. The first rotary shaft portion is joined to a second rotary portion so as to become freely rotatable, and the second rotary shaft portion is rotatably supported to the camera body 61. Owing to the functions of this biaxial rotation mechanism 63, as shown in FIG. 24, the liquid-crystal display apparatus 20 can take any arbitrary attitudes, such as the state in which it is faced to the side of the cameraman or the opposite state in which it is faced to the side of the object, by suitable operations such as to rotate the cover member 64.

FIG. 25 is a perspective view showing the specific example in which the electronic device according to the present invention is applied to a notebook type personal computer (hereinafter simply referred to as a notebook PC").

A notebook PC, generally depicted by reference numeral 70 in FIG. 25, includes a personal computer body 71, the liquid-crystal display apparatus 20 rotatably attached to the personal computer body 71 and the like.

As shown in FIG. 25, the personal computer body 71 is formed of a hollow casing shaped like substantially a rectangular prism. The personal computer body 71 houses in its inside a microcomputer, a storage device such as a RAM (random-access memory) and a ROM (read-only memory), a battery power supply and other devices, although not shown. An operation key pad 72 having a large-number of keys to enter information into the notebook PC 70 is provided on the upper surface of the personal computer body 71. The liquid-crystal display apparatus 20 is rotatably attached to the personal computer body 71 by hinge means 73 so as to freely open and close this operation key pad 72. When the notebook PC 70 having the above-mentioned arrangement is provided with the aforementioned liquid-crystal display apparatus 20 according to the present invention, it becomes possible to realize switching of visibility of the picture screen with high image quality (wide color reproducing range) and high luminance in various environments such as the outdoor by switching the light sources in response to the mobile environments.

In the first embodiment shown in FIG. 6, the value of the γ (gamma), for example, is 2.2 and luminance is 150 cd/m2. Also, in the second embodiment shown in FIG. 16, the value of the γ (gamma) can be switched to the two levels such as the level ranging of from 1.0 to 1.5 and the level of 2.2. Thus, luminance can be switched to two levels of 300 cd/m2 and 150 cd/m2.

As described above, according to the present invention, since the liquid-crystal display apparatus includes the liquid-crystal panel having the color filter, the first and second light sources, the illuminance detecting means and the light source control means so that the light-emitting diodes to be energized are switched in response to the environments under which the liquid-crystal display apparatus is in use, it is possible to realize a wide color reproducing range and high luminance by small electric power. For example, in the relatively dark place such as the indoor, the viewer becomes able to visually confirm the beautiful display screen with illumination from the RGB light-emitting diodes. On the other hand, in the bright place such as the outdoor, the viewer becomes able to visually confirm the display screen with only illumination from the W light-emitting diode. Therefore, the viewer becomes able to visually confirm the display screen of the liquid-crystal display apparatus for a long time period and the liquid-crystal display apparatus can be used while the light sources are switched in response to a use.

As set forth above, the present invention is not limited to the above-described embodiments. For example, while the electronic device according to the present invention was applied to the image pickup apparatus (camcoder (that is, camera+recorder), etc.) 60 and the notebook PC 70 as described above in the above-mentioned embodiments, the present invention is not limited thereto and it is needless to say that the present invention can be applied to various kinds of electronic devices using liquid-crystal display apparatus as display apparatus thereof, such as a mobile phone, a digital still camera, a PDA (personal digital assistant), a portable small-sized television receiver, a car navigation system and an electronic dictionary. As described above, the present invention can be variously modified without departing from the gist thereof.

According to the liquid-crystal display apparatus and the electronic device of the present invention, the illuminance detecting means compares the ambient illuminance of the liquid-crystal panel with the reference illuminance, and the light source control means switches the first and second light sources in response to the compared result of the illuminance, whereby the first light source for emitting white light is driven to decrease power consumption when a viewer watches the liquid-crystal panel in the outdoor with large illuminance or when a viewer watches the liquid-crystal panel over a long period of time. Whereas, when a user watches the liquid-crystal panel in the indoor with small illuminance, the second light source for emitting more than two lights containing white light is driven to widen a color reproducing range. As a result, the viewer is able to visually confirm clear and beautiful colors.

According to the present invention, it is possible to realize the liquid-crystal display apparatus and the electronic device in which the light source is switched in response to the ambient illuminance of the liquid-crystal panel and the two light sources are selectively used in response to a use so that power consumption can be, decreased efficiently, a time in, which the liquid-crystal display apparatus and the electronic device are driven in use can be extended, a color image can be made clear if necessary, thus to make it possible for the viewers to visually confirm beautiful pictures.

It should be understood by those skilled in the art that various modifications, combinations, sub-combinations and alterations may occur depending on design requirements and other factors insofar as they are within the scope of the appended claims or the equivalents thereof.

The invention claimed is:

1. A liquid-crystal display apparatus comprising:
   a liquid-crystal panel having a color filter;
   a plurality of first white light sources for irradiating first white light to said liquid-crystal panel;
   a plurality of second white light sources for irradiating second white light different from the first white light to said liquid-crystal panel;
   illuminance detecting means for detecting ambient illuminance of said liquid-crystal panel to output a detected signal; and
   light source control means for switching said first and second light sources based on the detected signal from said illuminance detecting means;
   wherein the plurality of first and second white light sources are interposed in a backlight array and aligned to illuminate a back side of said liquid-crystal panel;
   wherein each first white light source includes a blue light-emitting diode, a yellow fluorescent material, and a first reflecting layer and each second white light source includes an arbitrary-color light-emitting diode, a mixed-color fluorescent material, and a second reflecting layer.

2. The liquid-crystal display apparatus according to claim 1, wherein said light source control means compares the detected ambient illuminance with a predetermined illuminance reference value, said light source control means energizes said first white light sources when the detected ambient illuminance is greater than said illuminance reference value and said light source control means energizes said second white light sources when the detected ambient illuminance is less than said illuminance reference value.

3. The liquid-crystal display apparatus according to claim 1, wherein said illuminance detecting means includes at least one of a luminance sensor and a white balance sensor.

4. An electronic device including a liquid-crystal display device comprising a liquid-crystal panel having a color filter, a plurality of first white light sources for irradiating first white light to the liquid-crystal panel and a plurality of second white light sources for irradiating second white light different from said first white light to said liquid-crystal panel and a control apparatus for displaying color images by controlling the state in which light is passed through said liquid-crystal panel, said liquid-crystal display apparatus comprising:
   illuminance detecting means for detecting ambient illuminance of said liquid-crystal panel to output a detected signal; and
   light source control means for switching said first and second white light sources based on the detected signal from said illuminance detecting means;
   wherein the plurality of first and second white light sources are interposed in a backlight array and aligned to illuminate a back side of said liquid-crystal panel;
   wherein each first white light source includes a blue light-emitting diode, a yellow fluorescent material, and a first reflecting layer and each second white light source includes an arbitrary-color light-emitting diode, a mixed-color fluorescent material, and a second reflecting layer.

* * * * *